(12) United States Patent
Zhou et al.

(10) Patent No.: US 10,887,943 B2
(45) Date of Patent: Jan. 5, 2021

(54) PACKET EXCHANGE METHOD AND RELATED DEVICE

(71) Applicant: Huawei Technologies Co., Ltd., Guangdong (CN)

(72) Inventors: Wentao Zhou, Bangkok (TH); Dianfu Chen, Shenzhen (CN); Qingfen Liu, Shenzhen (CN); Zhimin Shen, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 9 days.

(21) Appl. No.: 16/364,792

(22) Filed: Mar. 26, 2019

(65) Prior Publication Data

US 2019/0223252 A1 Jul. 18, 2019

Related U.S. Application Data

(63) Continuation of application No. PCT/CN2017/093898, filed on Jul. 21, 2017.

(30) Foreign Application Priority Data

Sep. 28, 2016 (CN) .......................... 2016 1 0864813

(51) Int. Cl.
*H04W 80/02* (2009.01)
*H04W 76/12* (2018.01)
(Continued)

(52) U.S. Cl.
CPC ............. *H04W 80/02* (2013.01); *H04L 69/00* (2013.01); *H04L 69/30* (2013.01); *H04W 76/12* (2018.02)

(58) Field of Classification Search
CPC ..... H04W 80/02; H04W 76/12; H04W 76/10; H04L 69/00; H04L 69/30
See application file for complete search history.

(56) References Cited

U.S. PATENT DOCUMENTS

| 9,980,173 B2 * | 5/2018 | Lee ..................... H04L 67/12 |
| 2003/0137931 A1 * | 7/2003 | Hans ..................... H04L 29/06 |
| | | 370/216 |

(Continued)

FOREIGN PATENT DOCUMENTS

| CN | 1728715 A | 2/2006 |
| CN | 101442715 A | 5/2009 |

(Continued)

OTHER PUBLICATIONS

S2-164193 Motorola Mobility et al.,"Solution for ATSSS",SA WG2 Meeting #116,Jul. 11-15, 2016, Vienna, Austria,total 9 pages.

(Continued)

*Primary Examiner* — Min Jung
(74) *Attorney, Agent, or Firm* — Womble Bond Dickinson (US) LLP

(57) ABSTRACT

The present application discloses a packet exchange method and a related device. The method includes: obtaining, by a first device, a packet by using a Network Convergence Protocol (NCP) layer of the first device; and sending, by the first device, the packet to an NCP layer of a second device by using the NCP layer of the first device, where the NCP layer is located at a data link layer of a user plane, and the NCP layer of the first device and the NCP layer of the second device form a direct data exchange channel between the first device and the second device; and the first device is a terminal and the second device is a core network device, or the first device is a core network device and the second device is a terminal.

18 Claims, 20 Drawing Sheets

(51) Int. Cl.
*H04L 29/06* (2006.01)
*H04L 29/08* (2006.01)

(56) References Cited

U.S. PATENT DOCUMENTS

| | | |
|---|---|---|
| 2005/0185619 A1 | 8/2005 | Niemela et al. |
| 2008/0123604 A1 | 5/2008 | Shimizu |
| 2010/0136987 A1 | 6/2010 | Kim et al. |
| 2012/0087356 A1* | 4/2012 | Wentink ............ H04W 12/0017 370/338 |
| 2014/0355585 A1* | 12/2014 | Sadeghi ................ H04W 76/14 370/338 |
| 2018/0227219 A1* | 8/2018 | Zhang ..................... H04L 45/22 |
| 2019/0342785 A1* | 11/2019 | Li ............................ H04L 47/34 |
| 2020/0275499 A1* | 8/2020 | Novlan ............... H04W 56/001 |

FOREIGN PATENT DOCUMENTS

| | | |
|---|---|---|
| CN | 101494638 A | 7/2009 |
| CN | 103582159 A | 2/2014 |
| CN | 105357720 A | 2/2016 |
| EP | 2574107 A1 | 3/2013 |
| KR | 20060131671 A | 12/2006 |
| KR | 20160108472 A | 9/2016 |
| WO | 2006038268 A1 | 4/2006 |
| WO | 2006135201 A1 | 12/2006 |
| WO | 2013/123467 A1 | 8/2013 |
| WO | 2016007478 A1 | 1/2016 |

OTHER PUBLICATIONS

RFC791 Marina del Rey,"Internet Protocol DARPA Internet Program Protocol Specification",dated Sep. 1981,total 49 pages.

RFC6824 A. Ford et al.,"TCP Extensions for Multipath Operation with Multiple Addresses",Internet Engineering Task Force (IETF),dated Jan. 2013,total 64 pages.

3GPP TS 23.401 V14.1.0 (Sep. 2016),3rd Generation Partnership Project;Technical Specification Group Services and System Aspects;General Packet Radio Service (GPRS) enhancements for Evolved Universal Terrestrial Radio Access Network (E-UTRAN) access(Release 14),dated Sep. 26, 2016,total 379 pages.

* cited by examiner

PACKET EXCHANGE METHOD AND RELATED DEVICE

CROSS-REFERENCE TO RELATED APPLICATIONS

This application is a continuation of International Application No. PCT/CN2017/093898 filed on Jul. 21, 2017, which claims priority to Chinese Patent Application No. 201610864813.4 filed on Sep. 28, 2016. The disclosures of the aforementioned applications are hereby incorporated by reference in their entireties.

TECHNICAL FIELD

The present application relates to the field of communications technologies, and in particular, to a packet exchange method and a related device.

BACKGROUND

In a fifth generation mobile communications network (5G), scenarios such as fixed mobile convergence (FMC) multi-connection, private network awareness, and private network control require direct packet exchange between a terminal (UE) and a core network (CN). FMC means that a plurality of connections are established between the UE and the core network by using both a fixed access network and a mobile access network, and a working mode of the plurality of connections may be a steering mode, a splitting mode, an active/standby mode, or the like. A private network is a network formed after a direct device is connected to different devices by using Wi-Fi or Bluetooth. The direct device is a terminal that is directly connected to the fixed access network or the mobile access network and that is connected to the 5G core network, for example, a terminal connected to the mobile access network or a home gateway connected to the fixed access network. In the private network, a device that is connected to a direct device by using Wi-Fi or Bluetooth is referred to as an indirect device.

As defined in FMC networking of a 5G network shown in FIG. 1, a type 1 is a case in which there is only a mobile access network connection, a type 2 is a case in which there is only a fixed network connection, and a type 3 is a case in which there are both a mobile access network connection and a fixed network connection. Customer premise equipment (CPE) of the type 3 needs to support multi-connection established by using both 5G and a digital subscriber line (DSL), and UE of the type 3 needs to support multi-connection established by using both 5G and Wi-Fi indirect access.

In an FMC multi-connection scenario, a working mode of a plurality of connections needs to be negotiated between UE and the core network. If the working mode of FMC multi-connection is splitting, a packet sending sequence needs to be directly marked at a transmit end and a receive end between the UE and the core network. If the working mode of FMC multi-connection is steering, a packet needs to be exchanged between the UE and the core network to perform channel mapping for a flow.

FIG. 2 is a schematic diagram of scenarios in which UE and a core network need to interact directly in a 5G network. Four scenarios are mainly described: FMC multi-connection channel aggregation, FMC multi-connection channel management, private network awareness, and private network control. In these scenarios, the UE and the core network need to directly exchange information. The access scenarios shown in FIG. 3 are used as examples. Private network awareness means that CPE and UE each need to report a network status of a private network and a service type of a private network terminal to the 5G core network. Private network control means that the 5G core network needs to send a quality of service (QoS) policy, a virtual local area network (VLAN) plan, and the like of a private network terminal to the CPE or the UE.

Scheme 1: A 3GPP non-access stratum (NAS) is used to carry a packet used for implementing four functions: FMC multi-connection channel aggregation, FMC multi-connection channel management, private network awareness, and private network control.

FIG. 4 is a schematic diagram of a control plane protocol stack of E-UTRAN access in 3GPP TS 23.401, where the NAS is a direct interaction channel between the UE and the core network. When a terminal has a 3GPP connection, the terminal uses an extended NAS to carry the packet used for implementing four functions: FMC multi-connection channel aggregation, FMC multi-connection channel management, private network awareness, and private network control.

A disadvantage of the scheme 1 lies in that the 3GPP NAS, as a direct interaction channel between the UE and the core network, has the following limitations: A multi-path aggregation function is not supported. Because the NAS is a signaling plane function, the NAS cannot meet a requirement of a user plane multi-connection aggregation function for carrying a packet sequence number. When a 3GPP channel is unavailable and there is only a non-3GPP channel, for example, Wi-Fi or DSL that does not support the Wireless Local Area Network (WLAN) Control Protocol (WLCP), functions such as multi-connection channel management, private network awareness, and private network control cannot be supported. Signaling plane performance is affected. When the NAS performs transfer on a signaling plane channel, frequent packet transfer for multi-connection management, private network awareness, and private network control may directly increase 3GPP signaling load, and even increase a 3GPP signaling delay in a worse case. For example, problems that affect user experience in basic services may occur, such as switching interruption, an increased call initiation delay, and an increased paging delay.

Scheme 2: The Multipath Transmission Control Protocol (MPTCP) is used.

FIG. 5 shows a description of a protocol stack of the MPTCP in RFC6824. In this protocol stack, an application (Application) layer TCP flow is split into two TCP subflows at an MPTCP layer of a transmit end for separate transmission, and the two subflows are merged at a receive end and sent to an application layer.

FIG. 6 is a schematic diagram of a usage scenario of the MPTCP in RFC6824, and a host A and a host B each have two addresses. An aggregation point of subflows is located on a host, and an aggregation function of the subflows is not in the 5G core network.

A disadvantage of Scheme 2 lies in that the MPTCP, when used for FMC multi-connection aggregation between the UE and the core network, has the following limitations: The aggregation point of the MPTCP is on the host, not in the 5G core network. Therefore, in terms of function, the 5G core network cannot perform FMC multi-connection aggregation and management based on the MPTCP. The aggregation point of the MPTCP is at a layer above a TCP layer, and the layer is beyond a definition scope of the 3GPP, and the 3GPP cannot make innovations above the MPTCP layer.

Therefore, how to implement direct packet exchange between the UE and the core network in the 5G network is a problem to be resolved.

SUMMARY

Embodiments of the present application provide a packet exchange method and a related device, to implement direct packet exchange between UE and a core network in a 5G network.

According to a first aspect, an embodiment of the present application provides a packet exchange method, including: obtaining, by a first device, a packet by using a Network Convergence Protocol NCP layer; sending the packet to an NCP layer of a second device by using the NCP layer of the first device, where the NCP layer is located at a data link layer of a user plane, and the NCP layer of the first device and the NCP layer of the second device form a direct data exchange channel between the first device and the second device; and the first device may be a terminal and the second device may be a core network device, or the first device may be a core network device and the second device may be a terminal.

In the foregoing method, the NCP layer is configured at each of a data link layer of a user plane of the terminal and a data link layer of a user plane of the core network device, the NCP layer of the terminal and the NCP layer of the core network device form a direct data exchange channel, and the terminal and the core network device directly exchange a packet by using the direct data exchange channel, thereby implementing direct packet exchange between the terminal and the core network device.

In a possible implementation, the packet is a packet in a fixed mobile convergence FMC scenario. This further implements direct packet exchange in an FMC scenario.

In a possible implementation, the packet is a packet used for FMC multi-connection aggregation, a packet used for FMC multi-connection management, a packet used for private network awareness, or a packet used for private network control. This further implements direct packet exchange in different scenarios.

In a possible implementation, the NCP layer is located at the top of the data link layer, and located below an Internet Protocol IP layer. This does not affect an IP layer protocol and ensures compatibility of an application program.

In a possible implementation, if a Long Term Evolution LTE protocol is used for an access network AN between the first device and the second device, the NCP layer is located above a Packet Data Convergence Protocol PDCP layer; if a digital subscriber line DSL protocol is used for an access network AN between the first device and the second device, the NCP layer is located above a Point-to-Point Protocol PPP layer; if a trusted Wireless Fidelity Wi-Fi protocol is used for an access network between the first device and the second device, the NCP layer is located above a Medium Access Control MAC layer; or if an untrusted Wireless Fidelity Wi-Fi protocol is used for an access network between the first device and the second device, the NCP layer is located above an Internet Protocol Security IPSec layer. This further resolves a direct exchange problem in scenarios of different access network types.

In a possible implementation, a protocol header of the NCP layer is carried by using an Internet Protocol IP option of a specified option type; or a protocol header of the NCP layer includes an NCP type and NCP data. This further clarifies specific NCP implementation.

According to a second aspect, an embodiment of the present application provides a packet exchange method, including: receiving, by a first device by using a Network Convergence Protocol NCP layer, a packet transmitted by an NCP layer of a second device; and processing, by the first device, the packet, where the NCP layer is located at a data link layer of a user plane, and the NCP layer of the first device and the NCP layer of the second device form a direct data exchange channel between the first device and the second device; and the first device may be a terminal and the second device may be a core network device, or the first device may be a core network device and the second device may be a terminal.

In the foregoing method, the NCP layer is configured at each of a data link layer of a user plane of the terminal and a data link layer of a user plane of the core network device, the NCP layer of the terminal and the NCP layer of the core network device form a direct data exchange channel, and the terminal and the core network device directly exchange a packet by using the direct data exchange channel, thereby implementing direct packet exchange between the terminal and the core network device.

In a possible implementation, the packet is a packet in a fixed mobile convergence FMC scenario. This further implements direct packet exchange in an FMC scenario.

In a possible implementation, the packet is a packet used for FMC multi-connection aggregation, a packet used for FMC multi-connection management, a packet used for private network awareness, or a packet used for private network control. This further implements direct packet exchange in different scenarios.

In a possible implementation, the NCP layer is located at the top of the data link layer, and located below an Internet Protocol IP layer. This does not affect an IP layer protocol and ensures compatibility of an application program.

In a possible implementation, if a Long Term Evolution LTE protocol is used for an access network AN between the first device and the second device, the NCP layer is located above a Packet Data Convergence Protocol PDCP layer; if a digital subscriber line DSL protocol is used for an access network AN between the first device and the second device, the NCP layer is located above a Point-to-Point Protocol PPP layer; if a trusted Wireless Fidelity Wi-Fi protocol is used for an access network AN between the first device and the second device, the NCP layer is located above a Medium Access Control MAC layer; or if an untrusted Wireless Fidelity Wi-Fi protocol is used for an access network AN between the first device and the second device, the NCP layer is located above an Internet Protocol Security IPSec layer. This further resolves a direct exchange problem in scenarios of different access network types.

In a possible implementation, a protocol header of the NCP layer is carried by using an Internet Protocol IP option of a specified option type; or a protocol header of the NCP layer includes an NCP type and NCP data. This further clarifies specific NCP implementation.

According to a third aspect, an embodiment of the present application provides a device. The device has a function of implementing actions of the first device in the method implementation of the first aspect or the second aspect. The function may be implemented by hardware, or may be implemented by corresponding software executed by hardware. The hardware or software includes one or more modules corresponding to the foregoing functions.

According to a fourth aspect, an embodiment of the present application provides a device, including a processor, a memory, and a transceiver. The transceiver is configured to receive and send data under control of the processor. The memory stores a preset program. The processor reads the program in the memory, and performs the method in the first aspect or the second aspect according to the program.

Based on the foregoing technical solutions, in the embodiments of the present application, the NCP layer is configured at each of a data link layer of a user plane of the terminal and a data link layer of a user plane of the core network device, the NCP layer of the terminal and the NCP layer of the core network device form a direct data exchange channel, and the terminal and the core network device directly exchange a packet by using the direct data exchange channel, thereby implementing direct packet exchange between the terminal and the core network device.

DETAILED DESCRIPTION

To make the objectives, technical solutions, and advantages of the present application clearer, the following further describes the present application in detail with reference to the accompanying drawings. Apparently, the described embodiments are merely some rather than all of the embodiments of the present application. All other embodiments obtained by a person of ordinary skill in the art based on the embodiments of the present application without creative efforts shall fall within the protection scope of the present application.

A core idea of the present application is: A Network Convergence Protocol (NCP) layer is configured as an access standard-independent direct data exchange channel at a user-plane data link layer between UE and a CN. The configured NCP layer is used to implement direct packet exchange between the UE and the core network in a 5G network.

It should be noted that the configured NCP layer may be used in an FMC scenario or a non-FMC scenario. The following uses the FMC scenario as an example for description.

Figure 1:
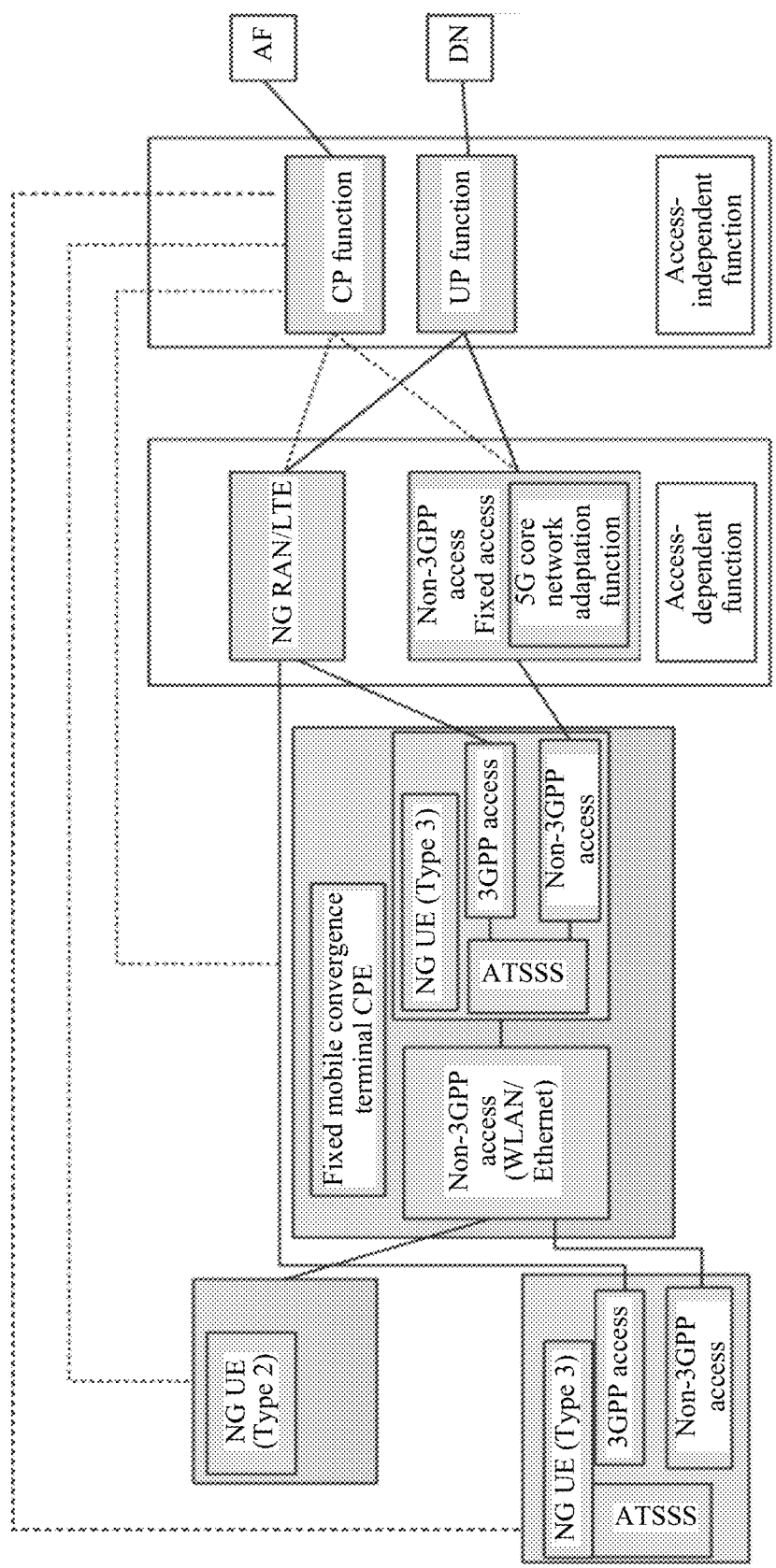
FIG. 1 is a schematic structural diagram of FMC networking of a 5G network.
Figure 2:
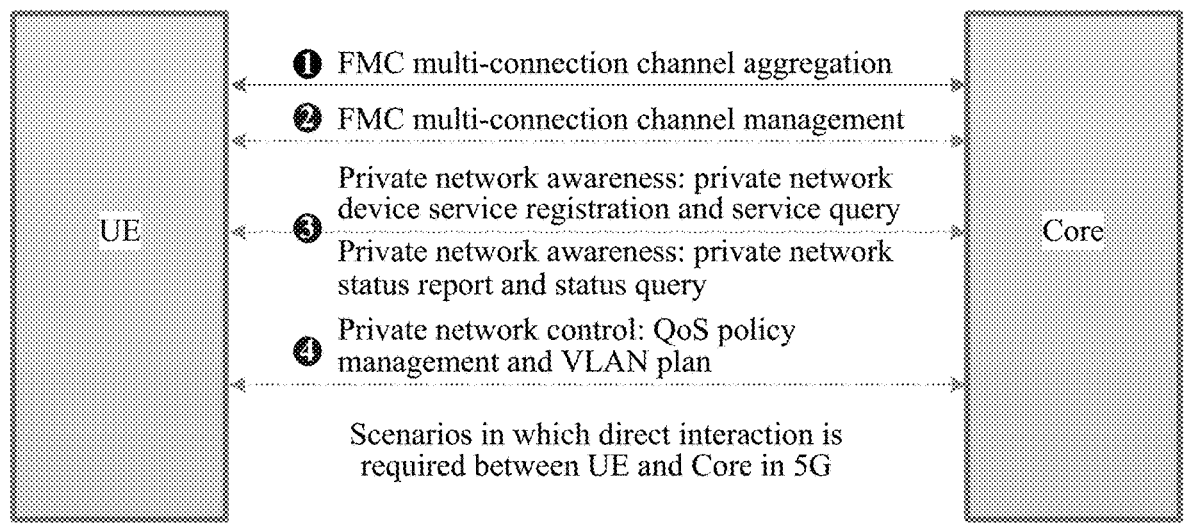
FIG. 2 is a schematic diagram of scenarios in which UE and a core network need to interact directly in a 5G network.
Figure 3:
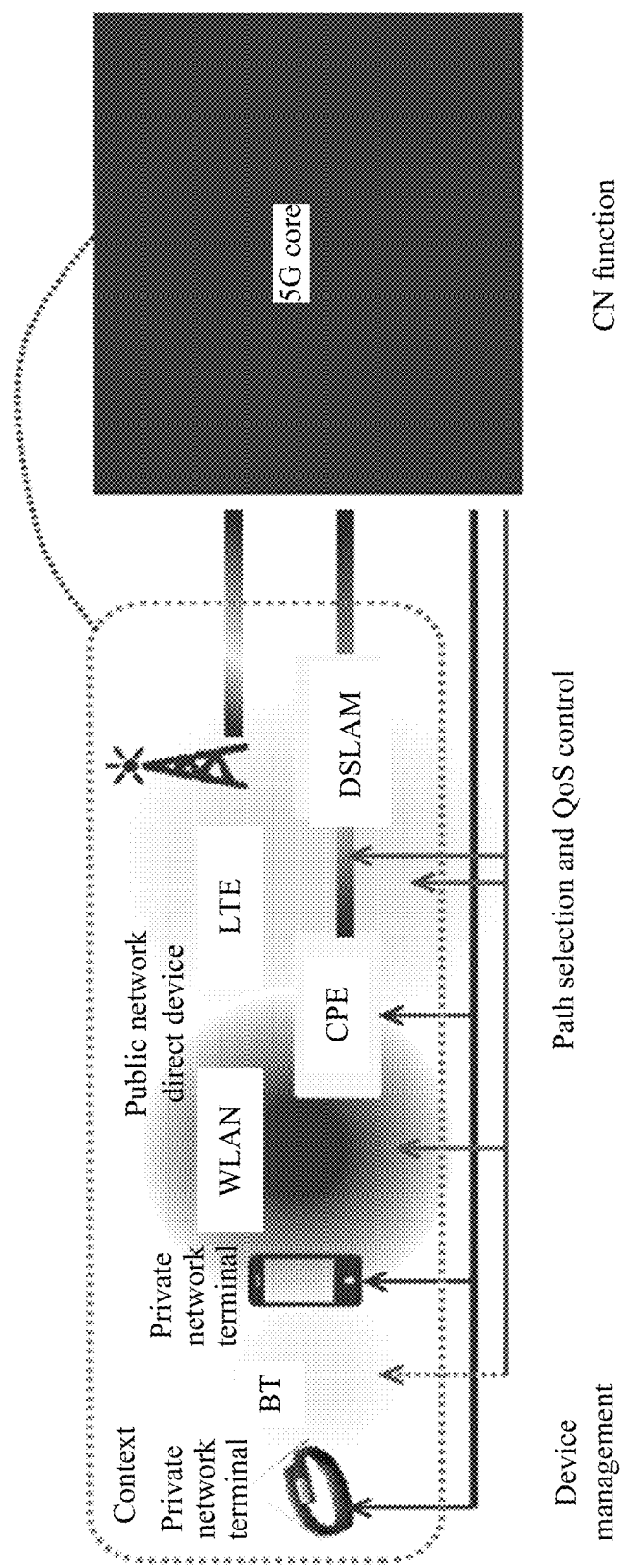
FIG. 3 is a schematic diagram of an access scenario.
Figure 4:
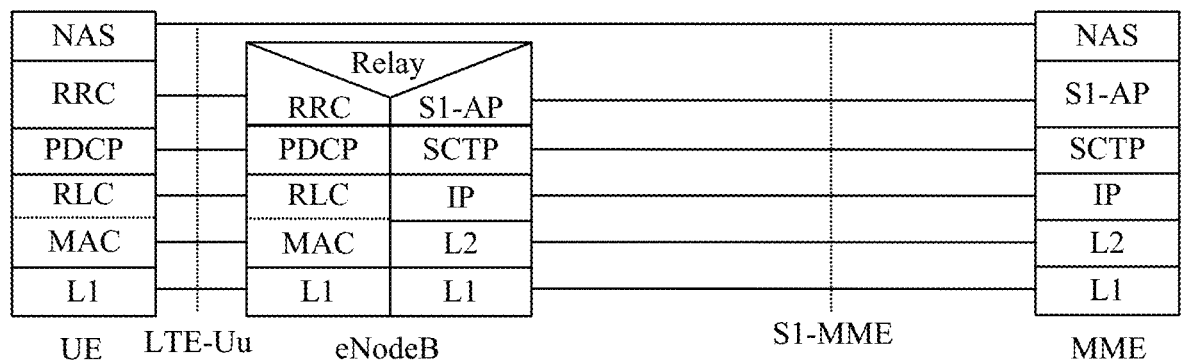
FIG. 4 is a schematic diagram of a control plane protocol stack of E-UTRAN access.
Figure 5:
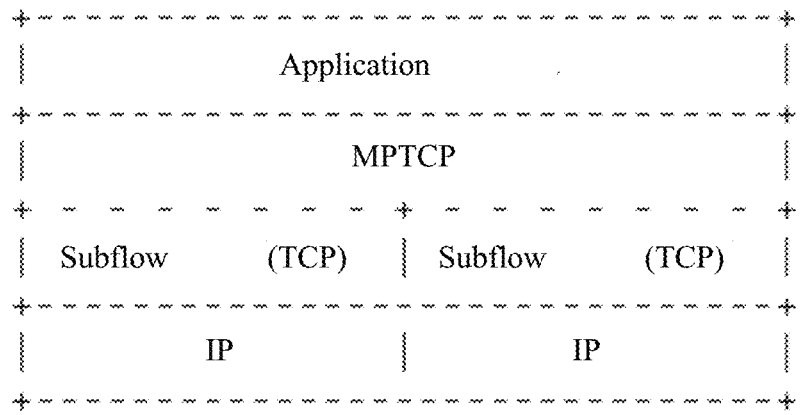
FIG. 5 is a schematic diagram of an MPTCP protocol stack.
Figure 6:
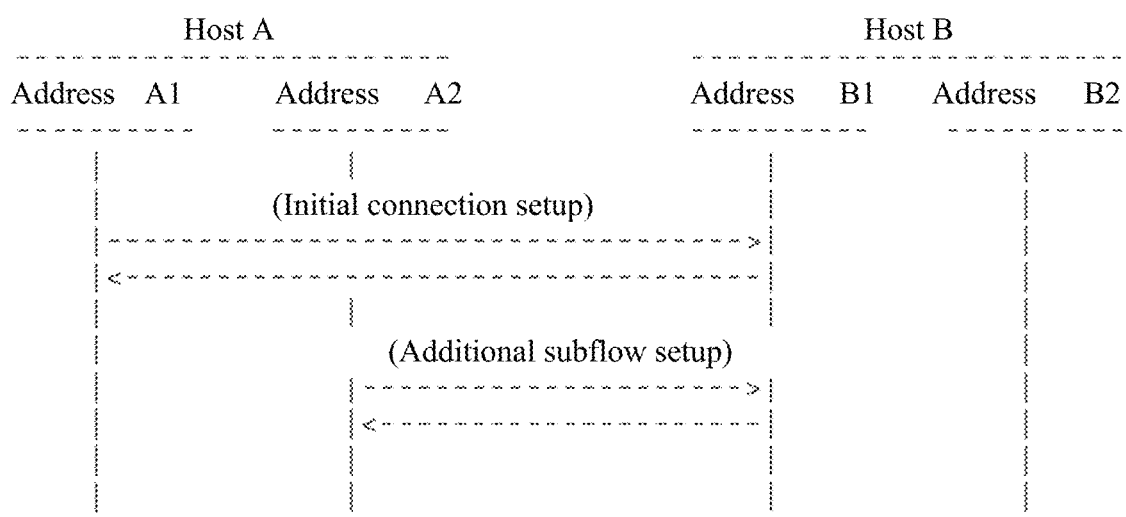
FIG. 6 is a schematic diagram of a usage scenario of the MPTCP.
Figure 7:
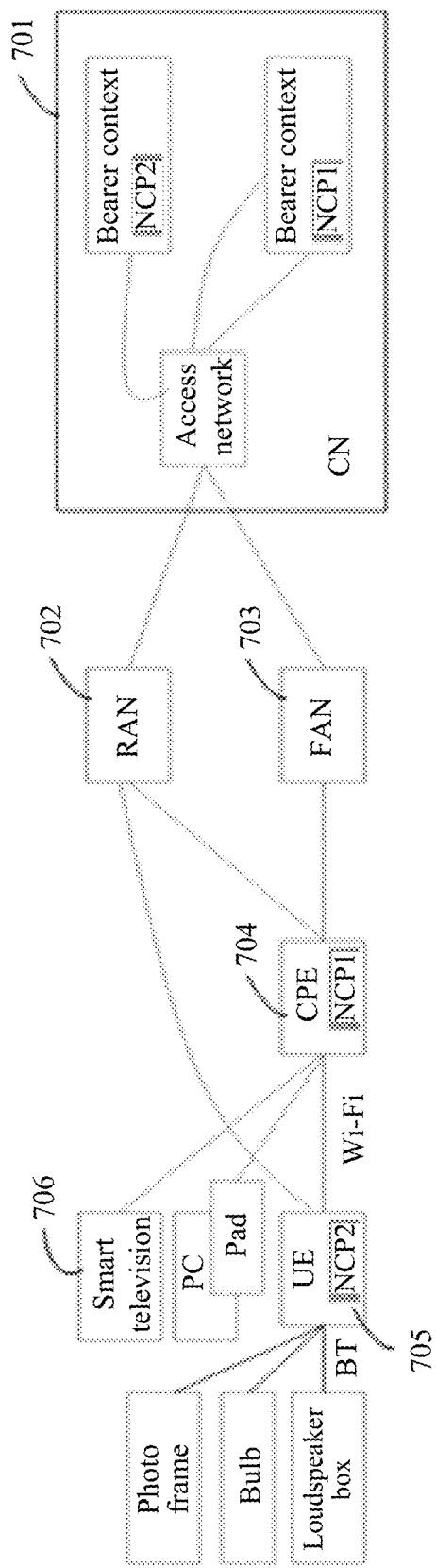
FIG. 7 is a schematic architectural diagram of a packet exchange system according to an embodiment of the present application.

In this embodiment of the present application, FIG. 7 is a schematic architectural diagram of a packet exchange system. The packet exchange system mainly includes a CN 701, a radio access network (RAN) 702, a fixed access network (FAN) 703, CPE 704, and UE 705.

The CN 701 is a 5G core network, and is mainly used for device mobility management, session management, security management, multi-connection management, private network awareness, and private network control.

The RAN 702 is mainly used for a radio access service of a 3GPP standard such as LTE or 5G.

The FAN 703 is mainly used for a fixed access service of DSL or the like.

The CPE 704 is mainly used to implement convergence access of home devices by using a private network such as Wi-Fi or Bluetooth.

The UE 705 is mainly used to implement convergence access of various Wi-Fi or Bluetooth devices by using a private network such as Wi-Fi or Bluetooth.

In a possible implementation, the system further includes other terminal devices 706. The other terminal devices mainly include a personal computer (PC), a smart television, a Bluetooth photo frame, a Bluetooth loudspeaker box, a Bluetooth bulb, and the like.

The following separately describes scenarios of FMC multi-connection, private network awareness, and private network control based on the packet exchange system.

(1) FMC Multi-Connection Scenario

The FMC multi-connection scenario includes two sub-scenarios: CPE multi-connection and UE multi-connection.

A. In the CPE multi-connection scenario, an NCP 1 protocol entity in the CPE 704 aggregates two connections: a RAN 702 connection and a FAN 703 connection, and an equivalent NCP 1 protocol entity in the CN 701 performs FMC multi-connection aggregation and FMC multi-connection management.

B. In the UE multi-connection scenario, an NCP 2 protocol entity in the UE 705 aggregates two connections: a RAN 702 connection and a Wi-Fi connection, and an equivalent NCP 2 protocol entity in the CN 701 performs FMC multi-connection aggregation and FMC multi-connection management.

(2) Private Network Awareness and Private Network Control Scenarios

The private network awareness and private network control scenarios include four sub-scenarios: CPE private network awareness, CPE private network control, UE private network awareness, and UE private network control.

A. In the CPE private network awareness scenario, the CPE 704 scans a network congestion status of the private network, scans for a device service of the private network, for example, a smart TV service, and reports, by using the NCP1, the network congestion status and the device service of the private network to the NCP 1 at a core network side; and the NCP 1 of the CN sends the network congestion status and the device service of the private network to a corresponding function entity in the CN for processing.

B. In the CPE private network control scenario, the NCP 1 of the CN sends a QoS policy or a VLAN plan of a device in the private network to the NCP 1 in the CPE, and the NCP 1 in the CPE sends the QoS policy or the VLAN plan to a corresponding function entity in the CPE for processing.

C. In the UE private network awareness scenario, the UE scans a network congestion status of the private network, scans for a device service of the private network, for example, a Bluetooth loudspeaker box service, and reports, by using the NCP 2, the network congestion status and the device service of the private network to the NCP 2 of the CN; and the NCP 2 of the CN sends the network congestion status and the device service of the private network to a corresponding function entity in the CN for processing.

D. In the UE private network control scenario, the NCP 2 of the CN sends a QoS policy or a VLAN plan of a device in the private network to the NCP 2 in the CPE, and the NCP 2 in the CPE sends the QoS policy or the VLAN plan to a corresponding function entity in the UE for processing.

It should be noted that in the following embodiments, data transferred between a terminal and the CN by using the NCP may not be limited to 3GPP signaling, and non-3GPP signaling, Si interface data, and the like may also be directly transferred between the terminal and the CN.

Figure 8:
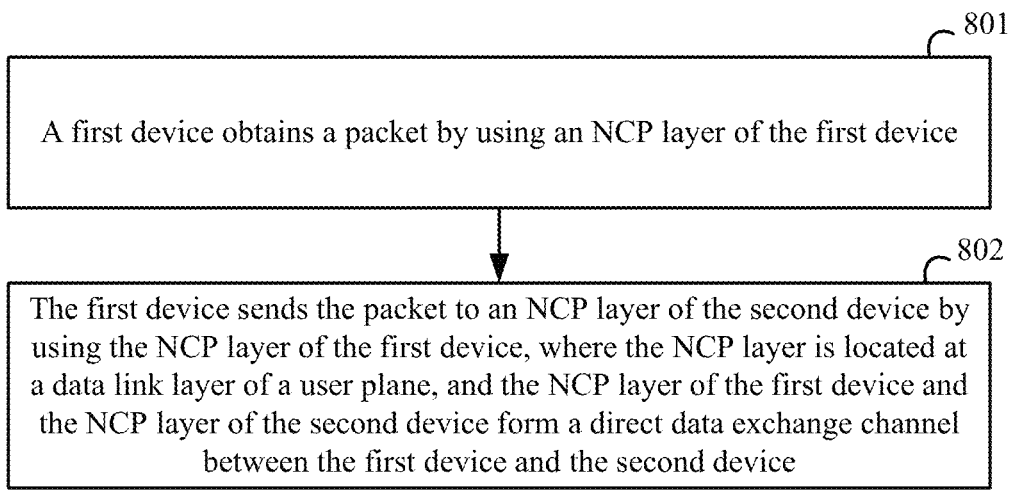
FIG. 8 is a schematic flowchart of a packet exchange method between a terminal and a CN according to an embodiment of the present application.

Based on a same application concept, in a first embodiment of the present application, FIG. 8 shows a detailed method procedure of packet exchange between a terminal and a CN, where a first device is a terminal and a second device is a core network device, or the first device is a core network device and the second device is a terminal. A specific description is as follows.

Step 801: The first device obtains a packet by using an NCP layer of the first device.

In a specific implementation, the packet is a packet in an FMC scenario.

In this embodiment, the packet in the FMC scenario may be a packet used for FMC multi-connection aggregation, a packet used for FMC multi-connection management, a packet used for private network awareness, or a packet used for private network control. It should be noted that the listed scenarios are only examples, the packet may alternatively be a packet in another FMC scenario, and the protection scope of the present application is not limited to the listed scenarios.

Step 802: The first device sends the packet to an NCP layer of the second device by using the NCP layer of the first device, where the NCP layer is located at a data link layer of a user plane, and the NCP layer of the first device and the NCP layer of the second device form a direct data exchange channel between the first device and the second device.

In a specific implementation, the NCP layer is located at the top of the data link layer, and located below an Internet Protocol (IP) layer.

Specifically, based on different access network (AN) protocols between the terminal and the core network, a position of the NCP layer is described as follows:

If a Long Term Evolution (LTE) protocol is used for an access network between the first device and the second device, the NCP layer is located above a Packet Data Convergence Protocol (PDCP) layer.

If a digital subscriber line DSL protocol is used for an access network between the first device and the second device, the NCP layer is located above a Point-to-Point Protocol (PPP) layer.

If a trusted Wi-Fi protocol is used for an access network between the first device and the second device, the NCP layer is located above a Medium Access Control (MAC) layer.

If an untrusted Wi-Fi protocol is used for an access network between the first device and the second device, the NCP layer is located above an Internet Protocol Security (IPSec) layer.

It should be noted that the NCP is independent of an access standard, and therefore the NCP may be applied to various access network standards. The following is merely an example. For example, an access network standard corresponding to the NCP may be standards such as LTE, 4.5G 5G Wi-Fi, DSL, WiMAX, CDMA, WCDMA, GSM, Zigbee, Bluetooth, and infrared.

In this embodiment of the present application, a protocol header of the NCP layer may be defined in at least one of the following two manners. Details are as follows:

In a first manner, the protocol header of the NCP layer is carried by using an IP option of a specified option type.

In a second manner, the protocol header of the NCP layer includes an NCP type and NCP data. For a definition of the NCP type, refer to a definition of a subtype in the IP option.

In this embodiment, the terminal may be UE or CPE.

Figure 9:
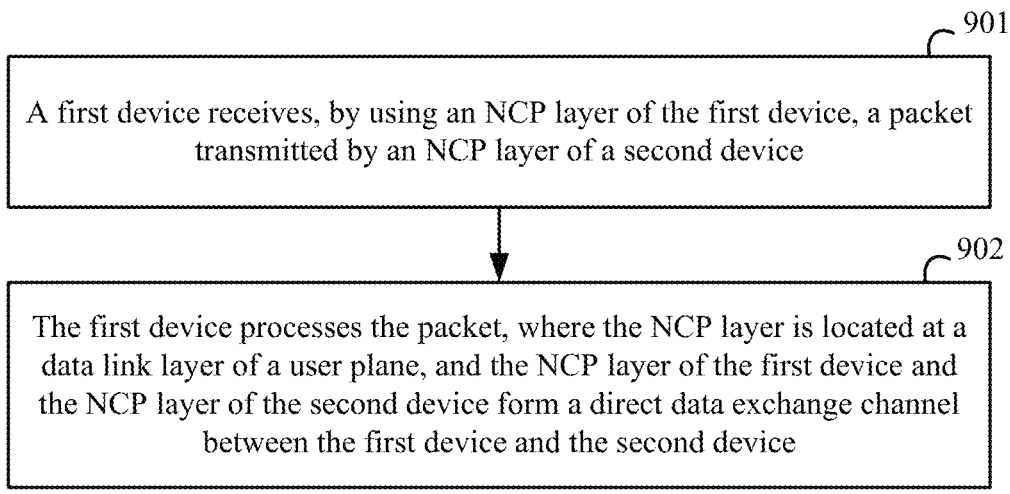
FIG. 9 is a schematic flowchart of another packet exchange method between a terminal and a CN according to an embodiment of the present application.

Based on a same inventive concept, in a second embodiment of the present application, FIG. 9 shows another detailed method procedure of packet exchange between a terminal and a CN, where a first device is a terminal and a second device is a core network device, or the first device is a core network device and the second device is a terminal. A specific description is as follows.

Step 901: The first device receives, by using an NCP layer of the first device, a packet transmitted by an NCP layer of the second device.

In a specific embodiment, the packet is a packet in an FMC scenario.

In this embodiment, the packet in the FMC scenario is a packet used for FMC multi-connection aggregation, a packet used for FMC multi-connection management, a packet used for private network awareness, or a packet used for private network control.

Step 902: The first device processes the packet, where the NCP layer is located at a data link layer of a user plane, and the NCP layer of the first device and the NCP layer of the second device form a direct data exchange channel between the first device and the second device.

In a specific implementation, the NCP layer is located at the top of the data link layer, and located below an Internet Protocol IP layer.

Specifically, based on different access network protocols between the terminal and the core network, a position of the NCP layer is described as follows:

If an LTE protocol is used for an access network between the first device and the second device, the NCP layer is located above a PDCP layer.

If a DSL protocol is used for an access network between the first device and the second device, the NCP layer is located above a PPP layer.

If the trusted Wi-Fi protocol is used for an access network between the first device and the second device, the NCP layer is located above a MAC layer.

If the untrusted Wi-Fi protocol is used for an access network between the first device and the second device, the NCP layer is located above an IPSec layer.

In this embodiment of the present application, a protocol header of the NCP layer may be defined in at least one of the following two manners. Details are as follows:

In a first manner, the protocol header of the NCP layer is carried by using an Internet Protocol IP option of a specified option type.

In a second manner, the protocol header of the NCP layer includes an NCP type and NCP data.

In this embodiment, the terminal may be UE or CPE.

The following uses specific embodiments as examples to describe a process of direct packet exchange between the UE and the core network in the 5G network in a case of FMC multi-connection.

Figure 10:
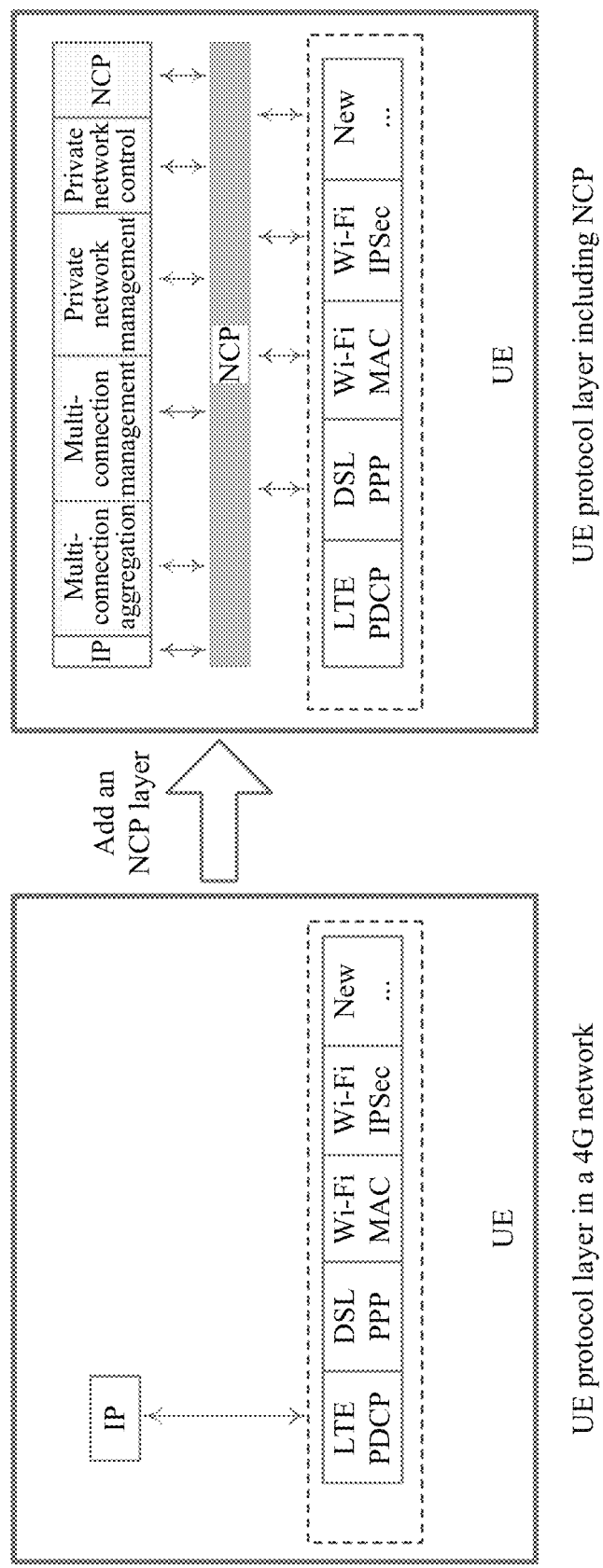
FIG. 10 is a schematic diagram of a position of an NCP layer in protocol layers of different communication access standards according to an embodiment of the present application.

(1) A Position of the NCP Layer at Protocol Layers of Different Communication Access Standards FIG. 10 is a schematic diagram of a position of an NCP layer at protocol layers of different communication access standards. In each communication access standard, the NCP layer is located at the data link layer, and located below an Internet Protocol (IP) layer.

Main functions of the NCP layer are: carrying a conventional IP packet, where transfer performance of the IP packet is ensured mainly by using a transparent transmission mode; carrying a packet sequence number header in multi-connection aggregation to support functions of multi-connection aggregation and splitting; carrying multi-connection management information, to implement functions of steering and switching between a plurality of FMC connections; carrying private network awareness information, so that a 5G core network can sense a status and a service of a private network; carrying private network control information, so that the 5G core network can control QoS and a VLAN plan of a private network device; and supporting NCP nesting.

The following uses positions of the NCP layer in LTE, DSL, trusted Wi-Fi, and untrusted Wi-Fi protocols as examples for description.

Figure 11:
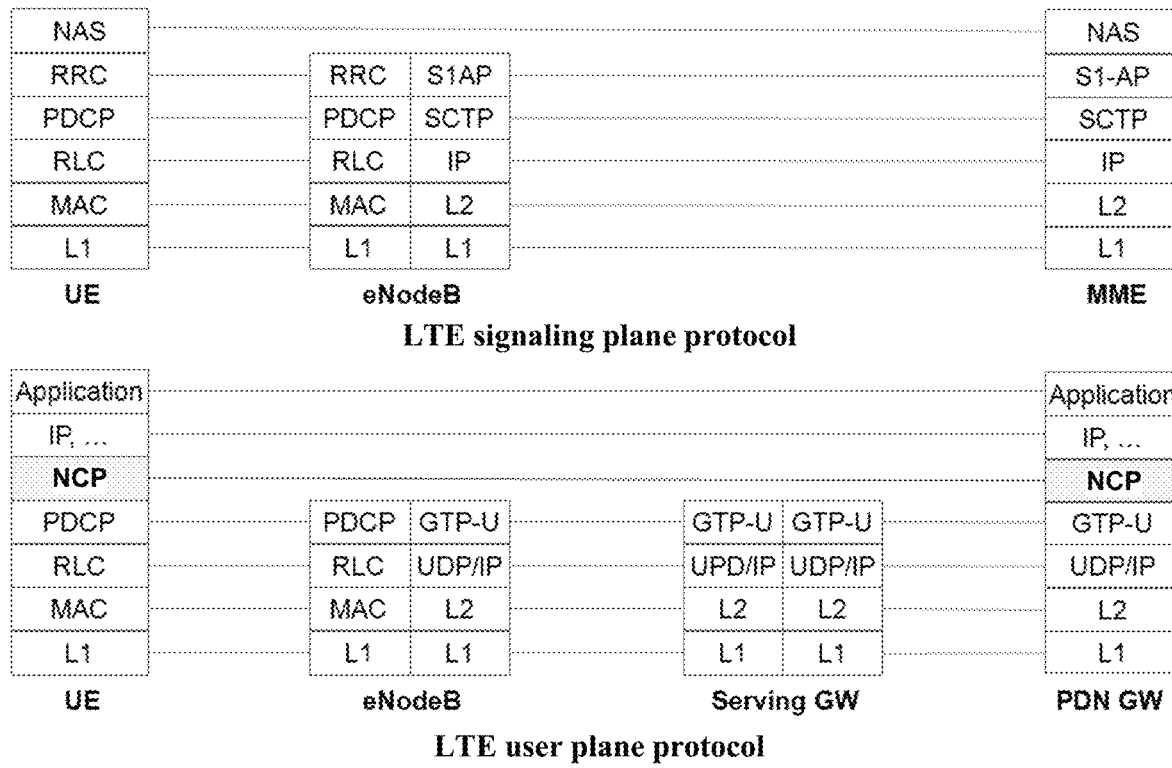
FIG. 11 is a schematic diagram of a position of an NCP layer in protocol layers of LTE according to an embodiment of the present application.

A. A position of the NCP layer in LTE protocol layers is shown in FIG. 11. The NCP layer is added above the Packet Data Convergence Protocol (PDCP) layer in the existing LTE protocol. The GTP-U supports transparent transmission at the NCP layer. In addition to carrying the IP packet, the NCP layer also carries another packet required by 5G. To improve transmission efficiency, the NCP layer is optional.

Figure 12:
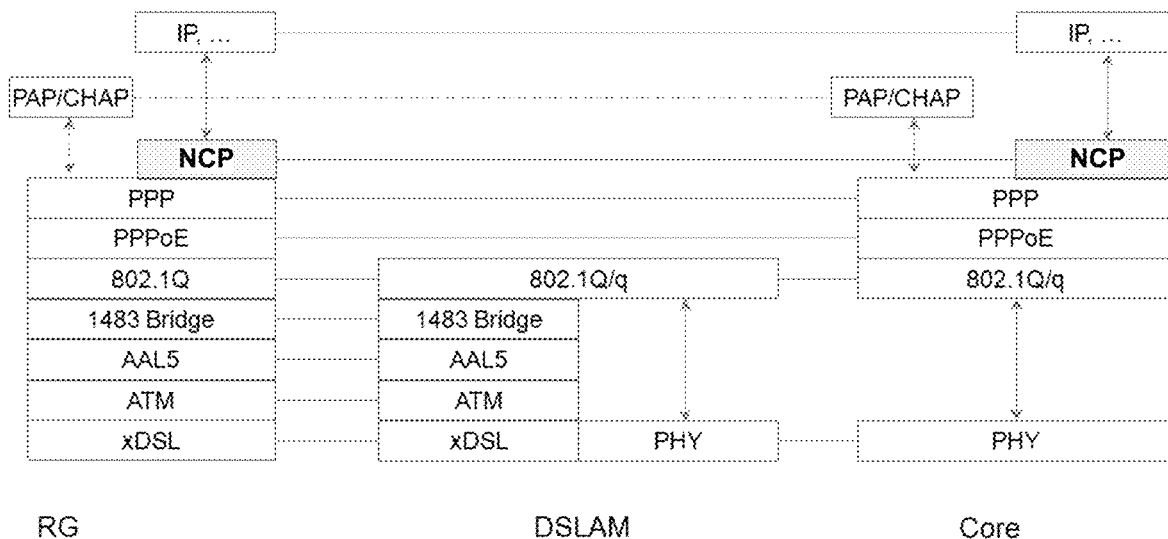
FIG. 12 is a schematic diagram of a position of an NCP layer in protocol layers of DSL according to an embodiment of the present application.

B. A position of the NCP layer in DSL protocol layers is shown in FIG. 12. The NCP layer is added above the PPP layer in the existing DSL protocol. In addition to carrying the IP packet, the NCP layer also carries another packet required by 5G. To improve transmission efficiency, the NCP layer is optional.

Figure 13:
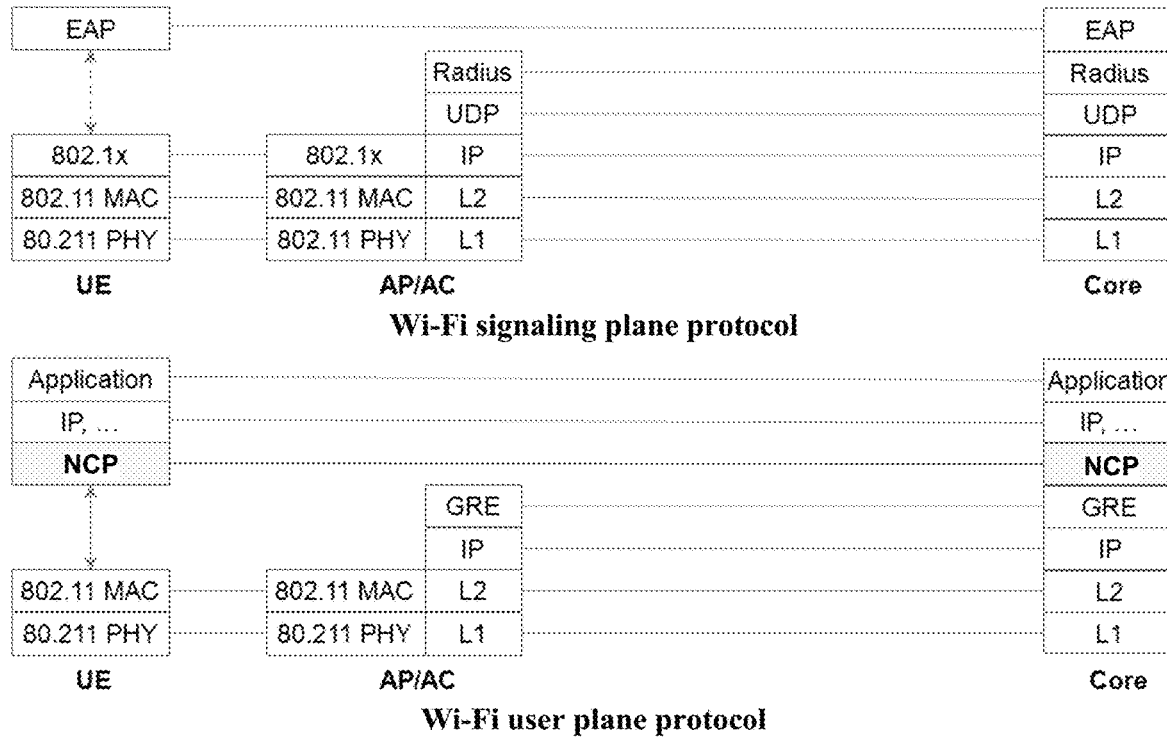
FIG. 13 is a schematic diagram of a position of an NCP layer in protocol layers of trusted Wi-Fi according to an embodiment of the present application.

C. A position of the NCP layer in trusted Wi-Fi protocol layers is shown in FIG. 13. The NCP layer is added above the MAC layer in the existing trusted Wi-Fi protocol. In addition to carrying the IP packet, the NCP layer also carries another packet required by 5G.

Figure 14:
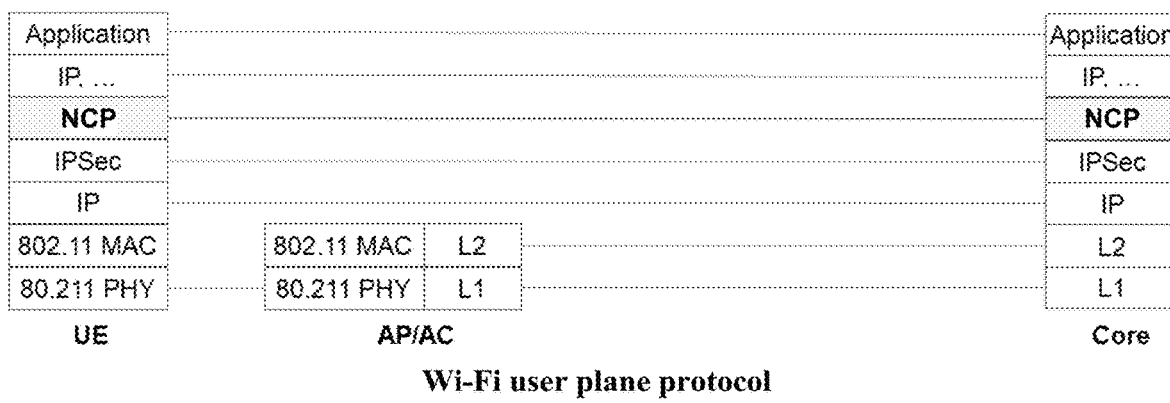
FIG. 14 is a schematic diagram of a position of an NCP layer in protocol layers of untrusted Wi-Fi according to an embodiment of the present application.

D. A position of the NCP layer in untrusted Wi-Fi protocol layers is shown in FIG. 14. The NCP layer is added above the IPSec layer in the existing untrusted Wi-Fi protocol. In addition to carrying the IP packet, the NCP layer also carries another packet required by 5G.

(2) A General Message Processing Procedure at the NCP Layer

Figure 15:
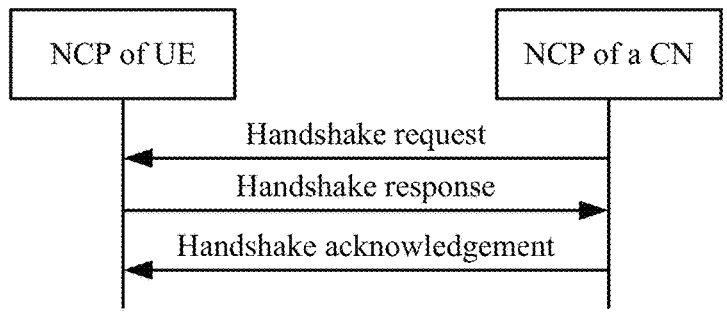
FIG. 15 is a schematic diagram of a process in which a direct device and a CN perform a handshake at an NCP layer to establish a link according to an embodiment of the present application.

A. Handshake-Based Link Establishment Between a Direct Device and a CN at the NCP Layer As shown in FIG. 15, an NCP layer of a CN proactively sends a handshake request message (Handshake-Request) to an NCP layer of UE, where the handshake request message may be carried in a service packet or a constructed dedicated packet. Optionally, the handshake request message carries a destination address, and the destination address is an IP address of the UE. The NCP layer of the UE returns a handshake response message (Handshake-Response) to the NCP layer of the CN. The NCP layer of the CN sends a handshake acknowledgement message (Handshake-ACK) to the NCP layer of the UE, to complete a process in which the direct device and the CN perform a handshake at the NCP layer to establish a link.

B. Data Transfer Between a Direct Device and a CN at the NCP Layer

Figure 16:
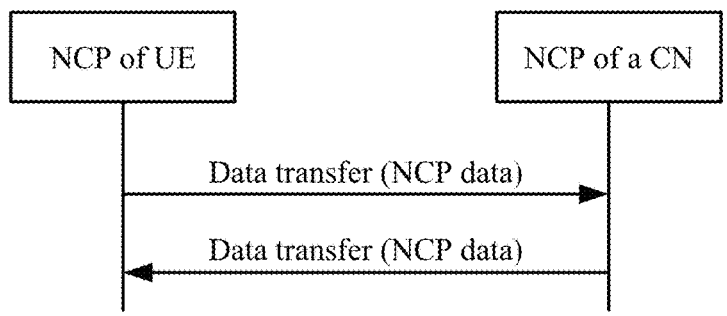
FIG. 16 is a schematic diagram of a process in which a direct device and a CN transfer data at an NCP layer according to an embodiment of the present application.

As shown in FIG. 16, an NCP layer of UE proactively sends NCP data to an NCP layer of a CN, where the NCP data may be carried in a service packet or a constructed dedicated packet; and the NCP layer of the CN determines, based on a service requirement, whether to return a response to the NCP layer of the UE. Alternatively, an NCP layer of a CN proactively sends NCP data to an NCP layer of UE, where the NCP data may be carried in a service packet or a constructed dedicated packet; and the NCP layer of the UE determines, based on a service requirement, whether to return a response to the NCP layer of the CN.

Figure 17:
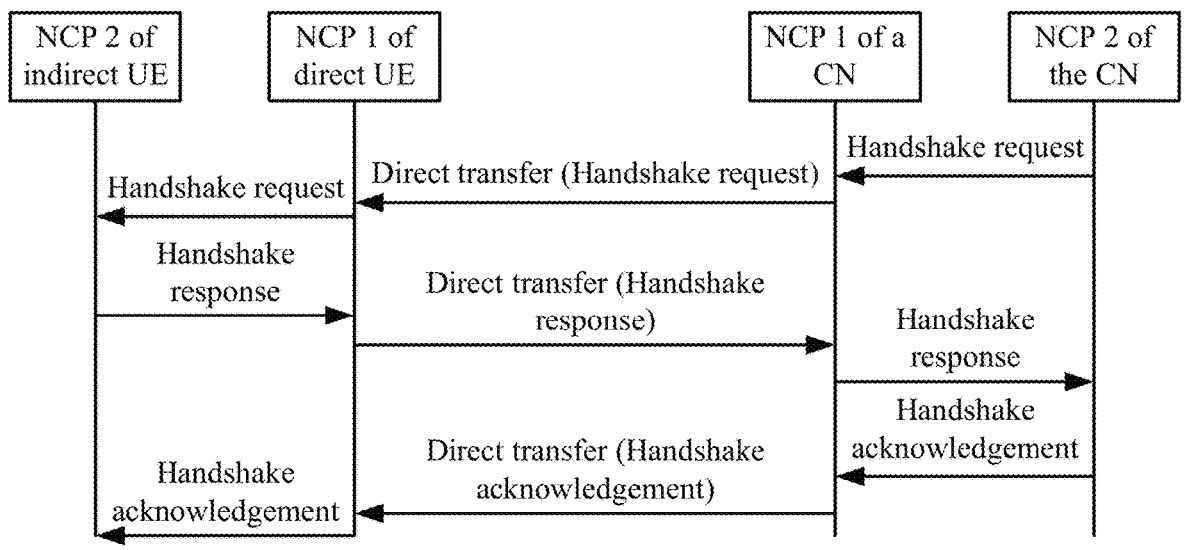
FIG. 17 is a schematic diagram of a process in which an indirect device and a CN perform a handshake at an NCP layer to establish a link according to an embodiment of the present application.

C. Handshake-Based Link Establishment Between an Indirect Device and a CN at the NCP Layer As shown in FIG. 17, an NCP 2 layer of a CN proactively sends a handshake request message to an NCP 2 layer of indirect UE, where the handshake request message may be carried in a service packet or a constructed dedicated packet. Specifically, the NCP 2 of the CN sends, to an NCP 1 of the CN, a handshake request message whose destination address is an IP address of the indirect UE. The NCP 1 of the CN transparently transmits the handshake request message to an NCP 1 layer of direct UE. When finding that the destination address of the handshake request message is not an IP address of the direct UE, the direct UE transparently transmits the handshake request message to the NCP 2 layer of the indirect UE.

After receiving the handshake request message, the NCP 2 layer of the indirect UE transparently transmits a handshake response message to the NCP 2 layer of the CN by using the NCP 1 of the direct UE and the NCP 1 layer of the CN.

The NCP 2 layer of the CN transparently transmits a handshake acknowledgement message to the NCP 2 layer of the indirect UE by using the NCP 1 layer of the CN and the NCP 1 layer of the direct UE. After the NCP 2 layer of the indirect UE receives the handshake acknowledgement message, a handshake-based link establishment process is completed.

D. Data Transfer Between an Indirect UE and a CN at the NCP Layer

Figure 18:
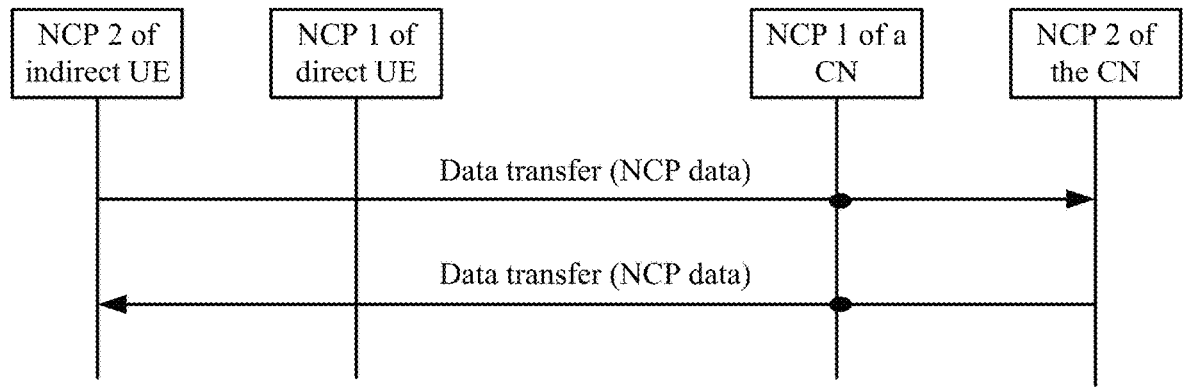
FIG. 18 is a schematic diagram of a process in which an indirect UE and a CN transfer data at an NCP layer according to an embodiment of the present application.

As shown in FIG. 18, an NCP 2 layer of indirect UE transparently transmits NCP data to an NCP 2 layer of a CN by using an NCP 1 layer of direct UE and an NCP 1 layer of the CN, where a packet that carries the NCP data carries an IP address of the NCP 2 layer of the CN. After the NCP 1 layer of the direct UE and the NCP 1 layer of the CN find that the IP address carried in the NCP data is not an IP address of the NCP 1 layer of the direct UE or an IP address of the NCP 1 layer of the CN, the NCP data is transparently transmitted. The NCP 2 layer of the CN determines whether to return a response based on service logic.

Alternatively, an NCP 2 layer of a CN transparently transmits NCP data to an NCP 2 layer of indirect UE by using an NCP 1 layer of the CN and an NCP 1 layer of direct UE, where a packet that carries the NCP data carries an IP address of the NCP 2 layer of the indirect UE. After the NCP 1 layer of the CN and the NCP 1 layer of the direct UE find that an IP address carried in the NCP data is not an IP address of the NCP 1 layer of the CN or an IP address of the NCP 1 layer of the direct UE, the NCP data is transparently transmitted. The NCP 2 layer of the indirect UE determines whether to return a response based on service logic.

E. NCP Application Programming Interface (Application Programming Interface, API)

Figure 19:
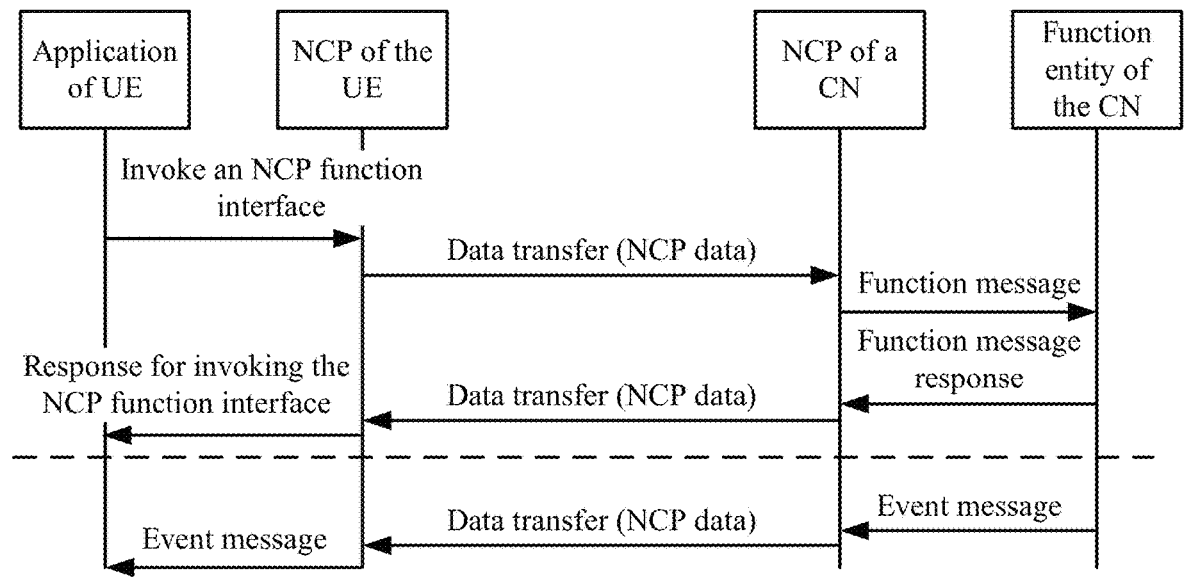
FIG. 19 is a schematic diagram of a process in which a parameter is transferred by using an NCP API interface according to an embodiment of the present application.

As shown in FIG. 19, an application installed in UE invokes an NCP function by using a FunctionInvoke function of an API interface. After encapsulating a parameter into NCP data, an NCP of the UE sends the NCP data to an NCP of a CN. The NCP of the CN invokes a corresponding function entity in the CN based on the encapsulated parameter in the NCP data. The function entity in the CN returns a response to the NCP of the CN, the NCP of the CN transmits the response to the NCP of the UE, and the NCP of the UE returns the response to the application in the UE.

If the application in the UE requests to subscribe to a specific event, after the event is triggered, the CN proactively notifies the NCP of the UE of the event by using the NCP of the CN, and then the NCP of the UE notifies the application of the UE of the event.

(3) An NCP Data Transfer Process in Different Scenarios

A. NCP Data Transfer in a Multi-Connection Mode Negotiation Process

Figure 20:
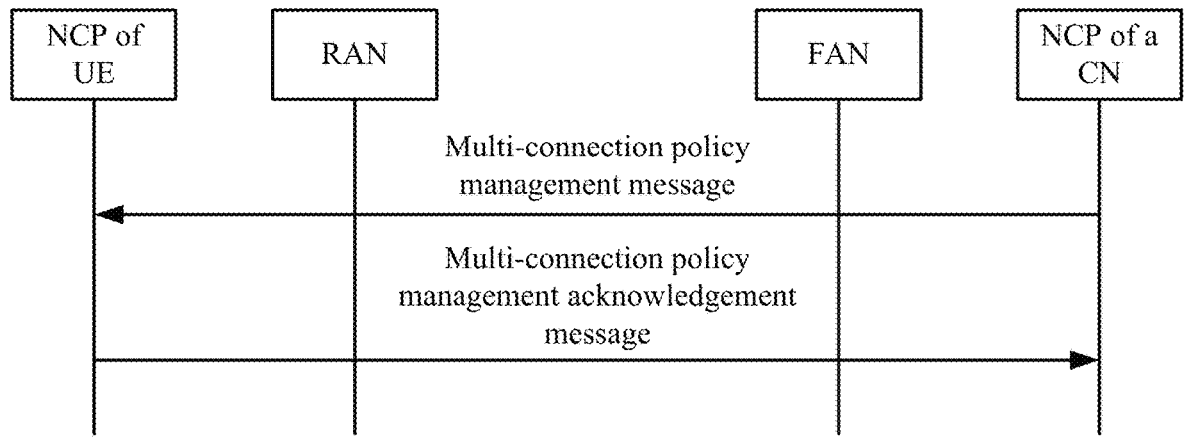
FIG. 20 is a schematic diagram of an NCP data transfer process in a multi-connection mode negotiation process according to an embodiment of the present application.

As shown in FIG. 20, an NCP layer of a CN proactively sends a multi-connection policy management message to an NCP layer of UE, where the multi-connection policy management message carries a session identifier and information indicating a specified multi-connection mode. The NCP of the UE returns a multi-connection policy management acknowledgement message to the NCP of the CN, where the multi-connection policy management acknowledgement message carries the session identifier and information indicating an acknowledged multi-connection mode.

The multi-connection mode includes but is not limited to any one or any combination of an active/standby mode, a steering mode, and a splitting mode.

In the active/standby mode, only one link of two or more links is in an active state and is used for data transfer, and other links are not used for data transfer.

In the steering mode, two or more links are in an active state simultaneously, but a same data flow can be sent only on a same link.

In the splitting mode, two or more links are in an active state simultaneously, but a same data flow can be sent on different links.

A multi-connection mode negotiation process proactively initiated by the NCP of the UE is similar to the foregoing process, and details are not described herein.

Figure 21:
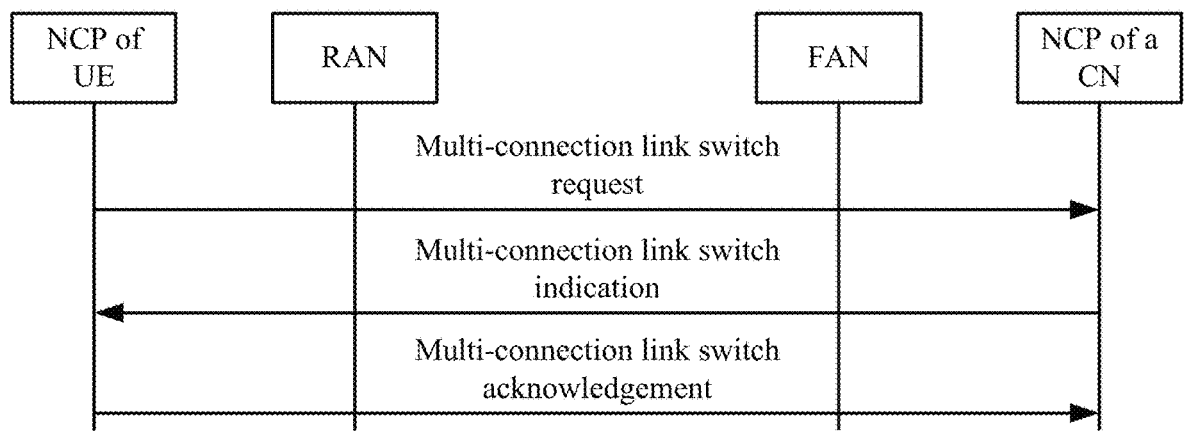
FIG. 21 is a schematic diagram of an NCP data transfer process in a link switching process corresponding to a multi-connection active/standby mode according to an embodiment of the present application.

B. NCP Data Transfer in a Link Switching Process in an Active/Standby Multi-Connection Mode As shown in FIG. 21, an NCP of UE sends a multi-connection link switch request to an NCP of a CN, where the multi-connection link switch request carries a session identifier and information indicating a requested active link. The NCP of the CN sends a multi-connection link switch indication to the NCP of the UE, where the multi-connection link switch indication carries the session identifier and the information indicating the requested active link. The NCP of the UE returns a multi-connection link switch acknowledgement to the NCP of the CN, where the multi-connection link switch acknowledgement carries the session identifier and information indicating the switched-to active link.

An active/standby link switching process proactively initiated by the NCP of the CN is similar to the foregoing process, and details are not described herein.

Figure 22:
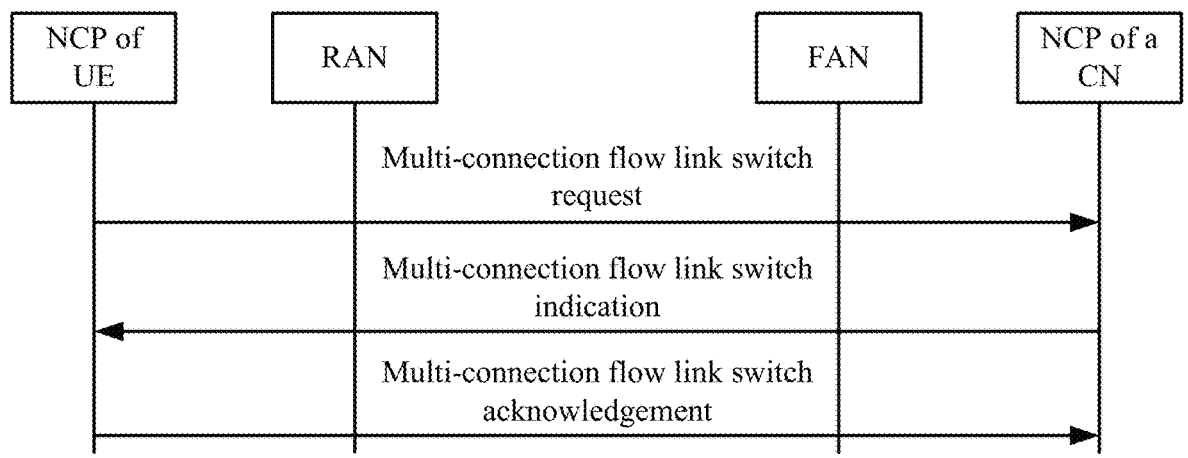
FIG. 22 is a schematic diagram of an NCP data transfer process in a link switching process corresponding to a multi-connection steering mode according to an embodiment of the present application.

C. NCP Data Transfer in a Link Switching Process in a Multi-Connection Steering Mode As shown in FIG. 22, an NCP of UE sends a multi-connection flow link switch request to an NCP of a CN, where the multi-connection flow link switch request carries a flow rule and a session identifier. The NCP of the CN sends a multi-connection flow link switch indication to the NCP of the UE, where the multi-connection flow link switch indication carries the flow rule and the session identifier. The NCP of the UE sends a multi-connection flow link switch acknowledgement to the NCP of the CN, where the multi-connection flow link switch acknowledgement carries an effective flow rule and the session identifier. The flow rule mainly includes flow information and a corresponding link identifier. The multi-connection flow link switch request, the multi-connection flow link switch indication, and the multi-connection flow link switch acknowledgement may carry one or more flow rules.

Figure 23:
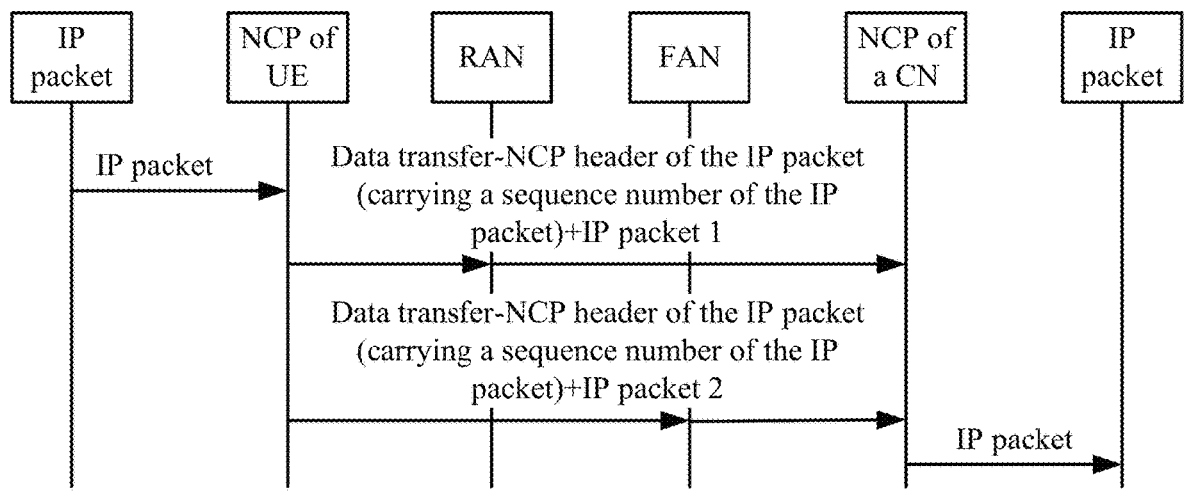
FIG. 23 is a schematic diagram of a splitting process according to an embodiment of the present application.

D. NCP Multi-Connection IP Packet Transfer in a Splitting Mode, Namely, a Multi-Connection Aggregation Mode As shown in FIG. 23, an IP packet of UE is sent to an NCP layer of the UE, and the NCP layer of the UE sends, in a splitting mode, the IP packet on different channels, and inserts an NCP header into each IP packet, where the NCP header includes a sequence number of the IP packet. After receiving the IP packets from different channels, an NCP layer of a CN sorts the IP packets based on the sequence number of the IP packet in the NCP header of each IP packet, and submits the IP packets to an IP layer of the CN.

E. NCP Multi-Connection IP Packet Transfer in a Steering Mode

Figure 24:
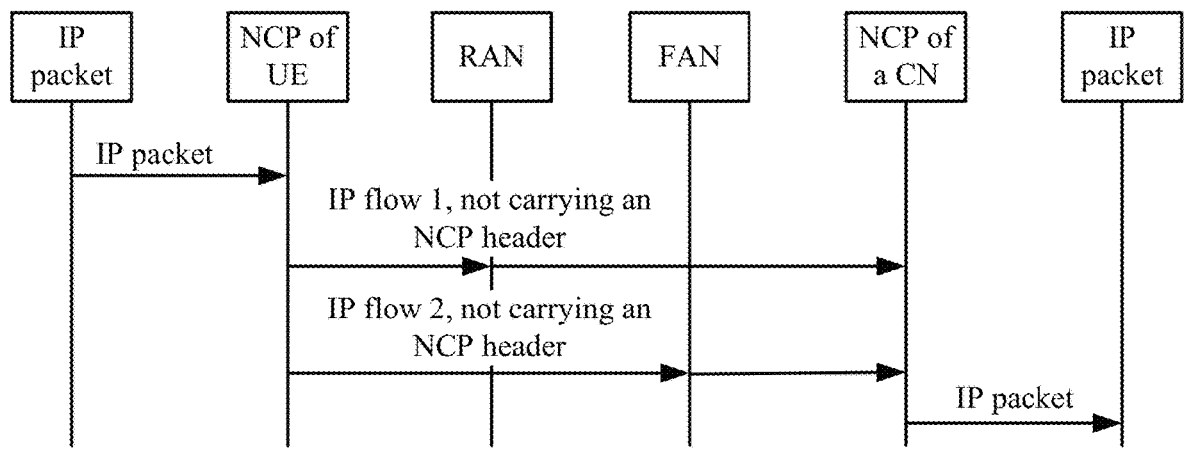
FIG. 24 is a schematic diagram of a steering process according to an embodiment of the present application.

As shown in FIG. 24, an IP packet of UE is sent to an NCP layer of the UE, the NCP layer of the UE sends, in a steering mode, the IP packet on different channels, where no NCP header is inserted into the IP packet. After receiving the IP packets from a synchronization channel, an NCP layer of a CN directly submits the IP packets to an IP layer of the CN.

F. NCP Multi-Connection IP Packet Transfer in an Active/Standby Mode

Figure 25:
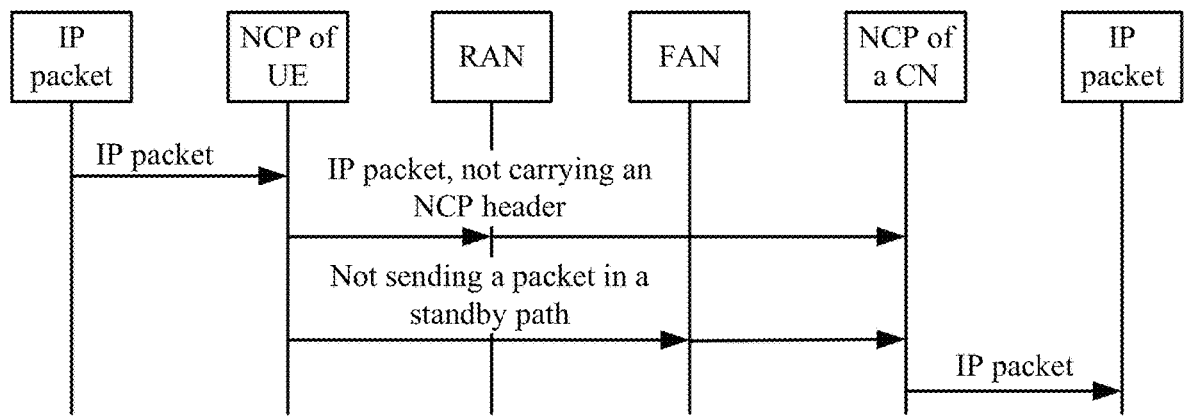
FIG. 25 is a schematic diagram of a packet transfer process in an active/standby mode according to an embodiment of the present application.

As shown in FIG. 25, an IP packet of UE is sent to an NCP layer of the UE, the NCP layer of the UE sends the IP packet only on an active channel, where no NCP header is inserted into the IP packet. After receiving the IP packet from the active channel, an NCP of a CN directly submits the IP packet to an IP layer of the CN.

G. IP Packet Transfer in an NCP Single Connection Mode

Figure 26:
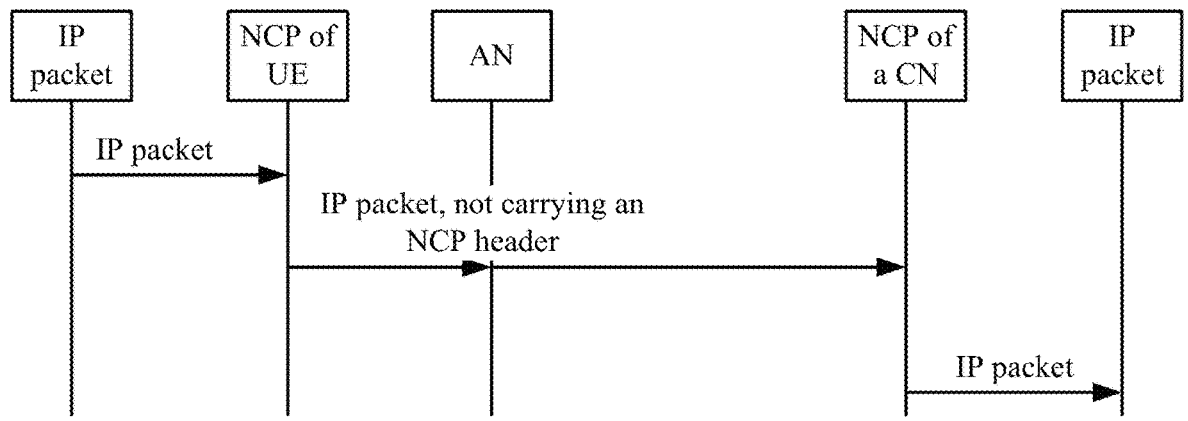
FIG. 26 is a schematic diagram of IP packet transfer in an NCP single connection mode according to an embodiment of the present application.

As shown in FIG. 26, an IP packet of UE is sent to an NCP layer of the UE, and the NCP layer of the UE transparently transmits the IP packet, where no NCP header is inserted into the IP packet. After receiving the IP packet, an NCP layer of a CN directly submits the IP packet to an IP layer of the CN.

H. NCP Data Transfer for Private Network Status Reporting

Figure 27:
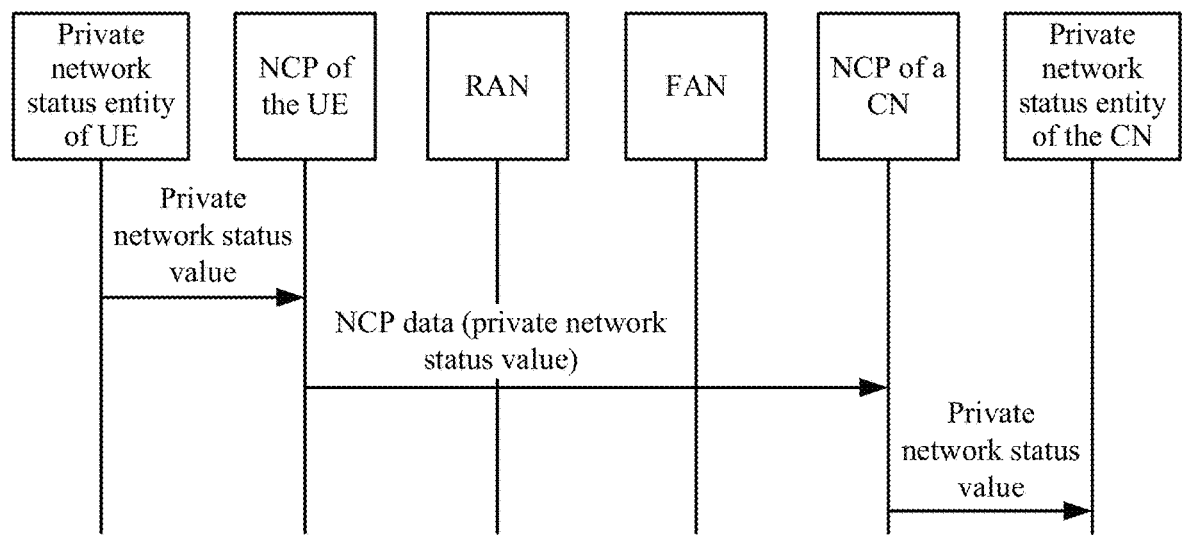
FIG. 27 is a schematic diagram of NCP data transfer used for private network status report according to an embodiment of the present application.

As shown in FIG. 27, a private network status entity of UE invokes an API interface of an NCP layer of the UE to send a private network status value to a CN. After receiving the private network status value, the NCP layer of the UE encapsulates the private network status value as NCP data and sends the NCP data to an NCP layer of the CN. After receiving a status report, the NCP layer of the CN forwards the status report to a private network status management entity of the CN.

I. NCP Data Transfer for Private Network Service Registration

Figure 28:
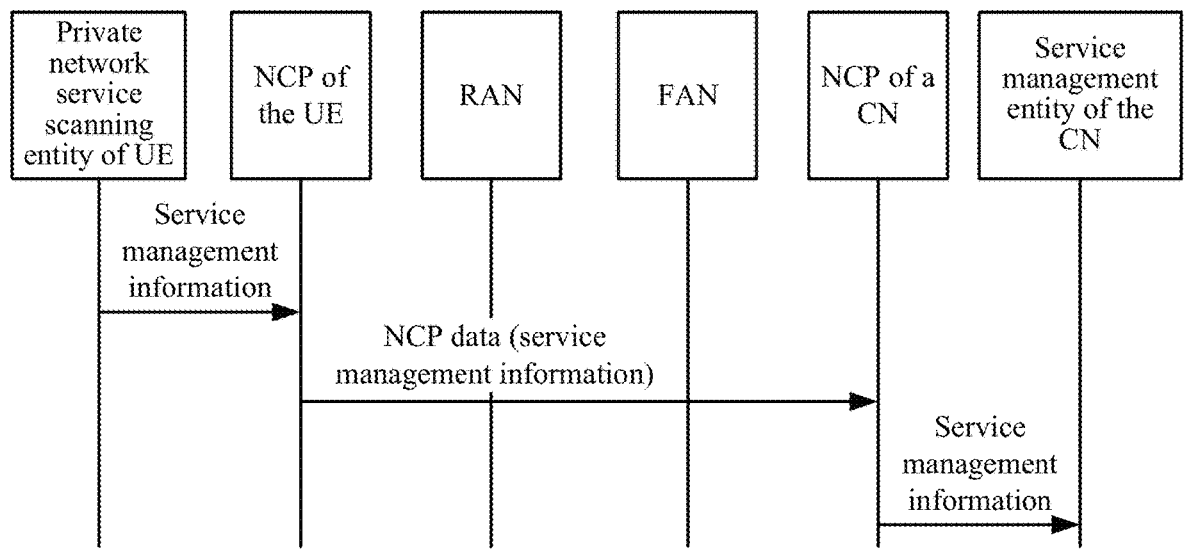
FIG. 28 is a schematic diagram of NCP data transfer used for private network service registration according to an embodiment of the present application.

As shown in FIG. 28, a private network service scanning entity of UE invokes an API interface of an NCP layer of the UE to send service management information to a CN. After receiving the service management information, the NCP layer of the UE encapsulates the service management information as NCP data and sends the NCP data to an NCP layer of the CN. The NCP layer of the CN forwards the service management information in the received NCP data to a service management entity of the CN.

J. NCP Data Transfer for Private Network Control

Figure 29:
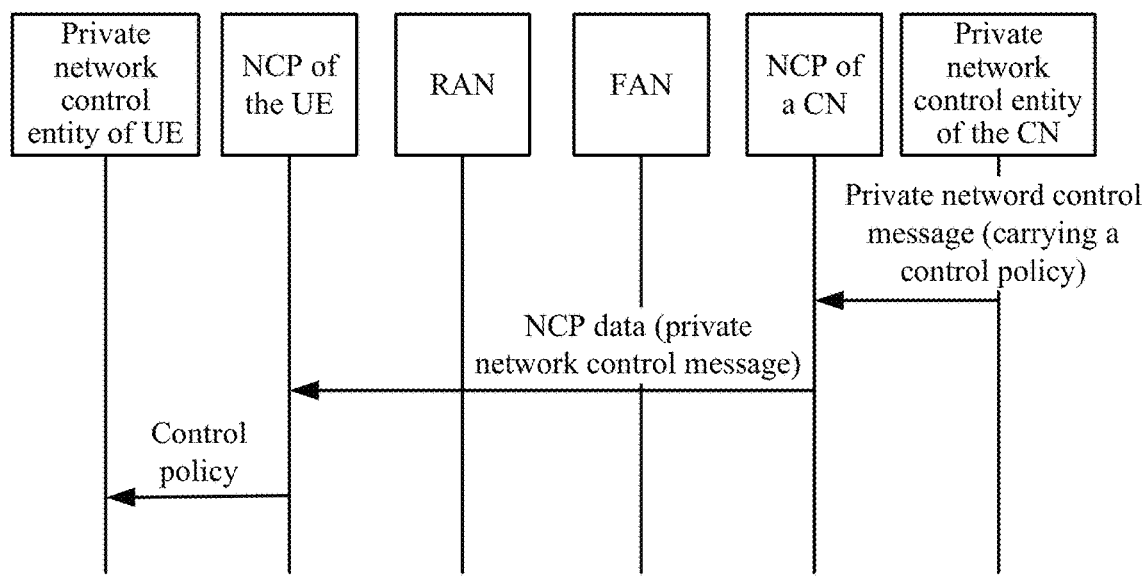
FIG. 29 is a schematic diagram of NCP data transfer used for private network control according to an embodiment of the present application.

As shown in FIG. 29, a private network control entity of a CN sends a private network control message to an NCP layer of the CN, where the private network control message carries a control policy. After receiving the private network control message, the NCP layer of the CN forwards the private network control message an NCP layer of UE. After receiving the private network control message, the NCP layer of the UE sends the control policy to a private network control entity of the UE by using a private network control entity registration callback function.

The control policy may include a QoS policy, for example, a QoS policy of a user in a private network or a QoS policy of a service in a private network.

(4) Definition of an NCP Protocol Header

In a first definition manner, an NCP layer belongs to a data link layer, and is located below an IP layer. To ensure that the NCP protocol header is compatible with an existing protocol system, the NCP header is implemented by using IP option. Correspondingly, an option type, for example, 28, may be applied separately for the NCP in the IETF.

Figure 30:
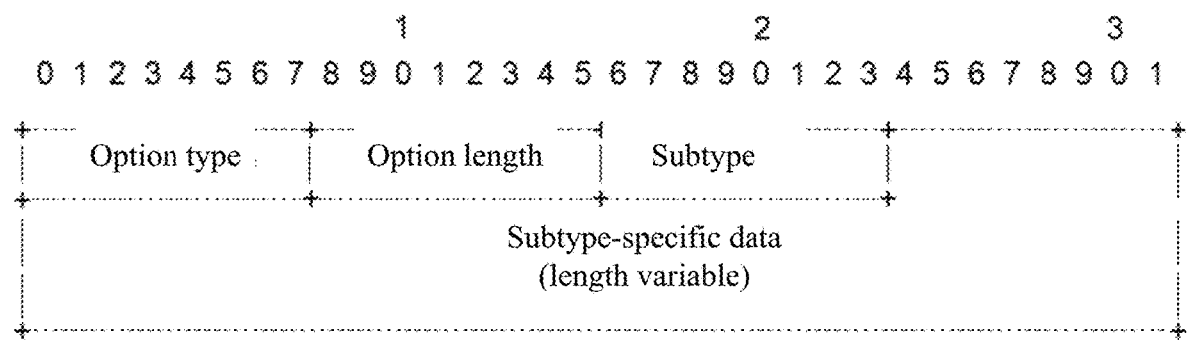
FIG. 30 is a schematic diagram of a definition of an IP option corresponding to an NCP protocol header according to an embodiment of the present application.

A definition of the IP option corresponding to the NCP is shown in FIG. 30. Specifically, when Option Type=28, if Subtype=0, the IP option indicates that a packet is Handshake-Request; if Subtype=1, the IP option indicates that a packet is Handshake-Response; if Subtype=2, the IP option indicates that a packet is Handshake-ACK; if Subtype=64, the IP option indicates that a packet is DataTransfer-Multipath Policy management; if Subtype=65, the IP option indicates that a packet is DataTransfer-Multipath Policy management Ack; if Subtype=66, the IP option indicates that a packet is DataTransfer-Multipath Link Switch Request; if Subtype=67, the IP option indicates that a packet is DataTransfer-Multipath Link Switch Indication; if Subtype=68, the IP option indicates that a packet is DataTransfer-Multipath Link Switch Ack; if Subtype=70, the IP option indicates that a packet is DataTransfer-Multipath Flow Link Switch Request; if Subtype=71, the IP option indicates that a packet is DataTransfer-Multipath Flow Link Switch Indication; if Subtype=72, the IP option indicates that a packet is DataTransfer-Multipath Flow Link Switch Ack; if Subtype=74, the IP option indicates that a packet is DataTransfer-Multipath Splitting; if Subtype=76, the IP option indicates that a packet is DataTransfer-Private Device Service Management; if Subtype=78, the IP option indicates that a packet is DataTransfer-Private Network Status Report; if Subtype=80, the IP option indicates that a packet is DataTransfer-Private Device Policy Control; if Subtype=82, the IP option indicates that a packet is DataTransfer-Private Device VLAN Control; if Subtype=84, the IP option indicates that a packet is DataTransfer-Nested NCP; if Subtype=86, the IP option indicates that a packet is DataTransfer-Non 3GPP NAS Signal; if Subtype=128, the IP option indicates that a packet is FunctionInvoke-Private Network Congestion Status; if Subtype=130, the IP option indicates that a packet is FunctionInvoke-Available Service Query in Private Network; and if Subtype=132, the IP option indicates that a packet is FunctionEvent-Private.

In a second definition manner, an NCP layer is located at the top of a data link layer, and based on different used access network protocols, the NCP layer needs to be carried above a PDCP layer, a PPP layer, a Wi-Fi MAC layer, or an IPSec layer.

For the 3GPP PDCP layer, a new SDU Type (for example, a value is 6) may be defined to indicate that a packet carried by the PDCP is an NCP packet.

For non-3GPP PPP, PDCP, Wi-Fi MAC, and IPSec layers above which the NCP layer is carried, a corresponding payload type needs to be set to a type identical with that of an IP packet, that is, 0x0800. In this case, an IP packet header compression function is not enabled for the PPP, PDCP, Wi-Fi MAC, and IPSec layers. The compression function may be implemented by the NCP layer. An NCP compression process is not defined in this specification. In other words, a packet type of the NCP layer uses a same definition as an IP packet type.

Figure 31:
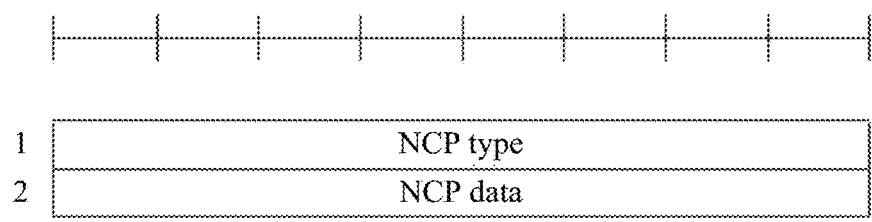
FIG. 31 is a schematic structural diagram of an NCP protocol header according to an embodiment of the present application.

FIG. 31 is a schematic structural diagram of a newly-defined NCP protocol header. The NCP protocol header includes an NCP type and NCP data. For a definition manner of the NCP type, refer to the subtype definition manner in the first definition manner.

Figure 32:
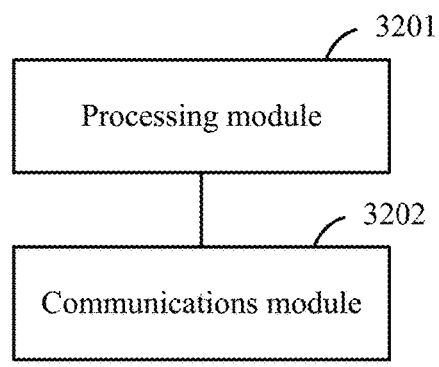
FIG. 32 is a schematic structural diagram of a device according to an embodiment of the present application.

Based on a same application idea, a third embodiment of the present application provides a device. For specific implementation of the device, refer to the related descriptions about the first device in the first embodiment. Repeated content is not described herein again. As shown in FIG. 32, the device mainly includes:

a processing module 3201, configured to obtain a packet by using an NCP layer of the device; and a communications module 3202, configured to send the packet to an NCP layer of a second device by using the NCP layer of the device, where the NCP layer is located at a data link layer of a user plane, and the NCP layer of the device and the NCP layer of the second device form a direct data exchange channel between the device and the second device.

The device is a terminal and the second device is a core network device, or the device is a core network device and the second device is a terminal.

Figure 33:
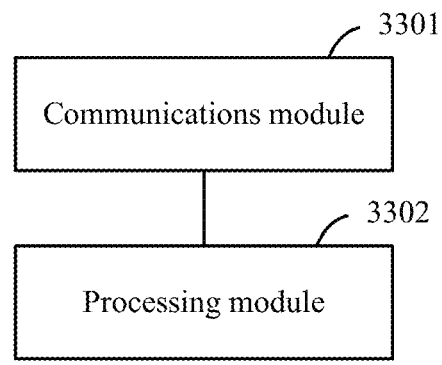
FIG. 33 is a schematic structural diagram of another device according to an embodiment of the present application.

Based on a same application idea, a fourth embodiment of the present application provides another device. For specific implementation of the device, refer to the related descriptions about the first device in the second embodiment. Repeated content is not described herein again. As shown in FIG. 33, the device mainly includes:

a communications module 3301, configured to receive, by using an NCP layer of the device, a packet transmitted by an NCP layer of a second device; and a processing module 3302, configured to process the packet.

The NCP layer is located at a data link layer of a user plane, and the NCP layer of the device and the NCP layer of the second device form a direct data exchange channel between the device and the second device.

The device is a terminal and the second device is a core network device, or the device is a core network device and the second device is a terminal.

Figure 34:
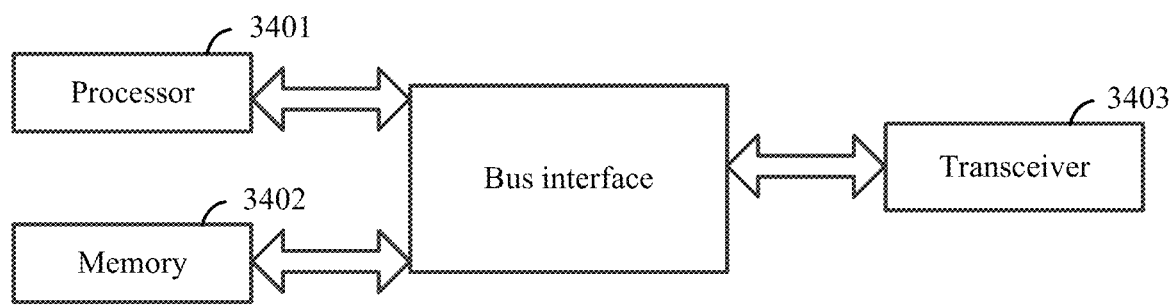
FIG. 34 is a schematic structural diagram of another device according to an embodiment of the present application.

Based on a same application idea, a fifth embodiment of the present application further provides a device. For specific implementation of the device, refer to the descriptions about the first device in the first embodiment. Repeated content is not described herein again. As shown in FIG. 34, the device mainly includes a processor 3401, a memory 3402, and a transceiver 3403. The transceiver 3403 is configured to receive and send data under control of the processor 3401. The memory 3402 stores a preset program. The processor 3401 reads the program in the memory 3402, and performs the following process according to the program:

obtaining a packet by using an NCP layer of the device; and instructing the transceiver to send the packet to an NCP layer of a second device by using the NCP layer of the device, where the NCP layer is located at a data link layer of a user plane, and the NCP layer of the device and the NCP layer of the second device form a direct data exchange channel between the device and the second device.

The device is a terminal and the second device is a core network device, or the device is a core network device and the second device is a terminal.

Specifically, the processor is configured to perform a function of the processing module in the third embodiment, and the transceiver is configured to perform a function of the communications module in the third embodiment under control of the processor.

Specifically, if the device is a terminal, the terminal is UE.

Figure 35:
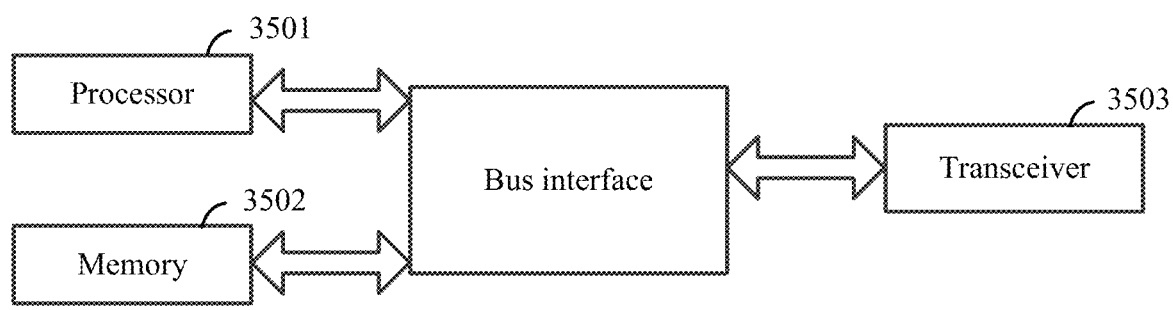
FIG. 35 is a schematic structural diagram of another device according to an embodiment of the present application.

Based on a same application idea, a sixth embodiment of the present application further provides a device. For specific implementation of the device, refer to the descriptions about the first device in the second embodiment. Repeated content is not described herein again. As shown in FIG. 35, the device mainly includes a processor 3501, a memory 3502, and a transceiver 3503. The transceiver 3503 is configured to receive and send data under control of the processor 3501. The memory 3502 stores a preset program. The processor 3501 reads the program in the memory 3502, and performs the following process according to the program:

instructing the transceiver to receive, by using an NCP layer of the device, a packet transmitted by an NCP layer of a second device; and processing the packet.

The NCP layer is located at a data link layer of a user plane, and the NCP layer of the device and the NCP layer of the second device form a direct data exchange channel between the device and the second device.

The device is a terminal and the second device is a core network device, or the device is a core network device and the second device is a terminal.

Specifically, the processor is configured to perform a function of the processing module in the fourth embodiment, and the transceiver is configured to perform a function of the communications module in the fourth embodiment under control of the processor.

Specifically, if the device is a terminal, the terminal is UE.

In FIG. 34 and FIG. 35, the processor, the memory, and the transceiver are connected by using a bus. A bus architecture may include any quantity of interconnected buses and bridges, and specifically connects together a circuit of one or more processors represented by the processor and a circuit of a memory represented by the memory. The bus architecture may further connect, for example, a peripheral device or a voltage stabilizer to various other circuits such as a power management circuit. These are well known in the art, and therefore are not further described in this specification. A bus interface provides an interface. The transceiver may be a plurality of components, that is, including a transmitter and a receiver, and provides units configured to communicate with various other apparatuses on a transmission medium. The processor is responsible for management of the bus architecture and general processing, and the memory may store data that is used by the processor to perform an operation.

Figure 36:
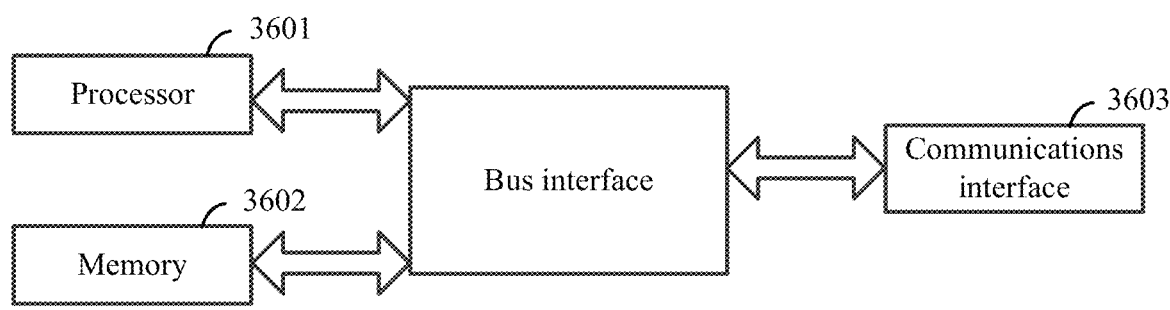
FIG. 36 is a schematic structural diagram of another device according to an embodiment of the present application.

Based on a same application idea, a seventh embodiment of the present application further provides a device. For specific implementation of the device, refer to the descriptions about the first device in the first embodiment. Repeated content is not described herein again. As shown in FIG. 36, the device mainly includes a processor 3601, a memory 3602, and a communications interface 3603. The communications interface 3603 is configured to receive and send data under control of the processor 3601. The memory 3602 stores a preset program. The processor 3601 reads the program in the memory 3602, and performs the following process according to the program:

obtaining a packet by using an NCP layer of the device; and instructing the communications interface to send the packet to an NCP layer of a second device by using the NCP layer of the device, where the NCP layer is located at a data link layer of a user plane, and the NCP layer of the device and the NCP layer of the second device form a direct data exchange channel between the device and the second device.

The device is a terminal and the second device is a core network device, or the device is a core network device and the second device is a terminal.

Specifically, the processor is configured to perform a function of the processing module in the third embodiment, and the communications interface is configured to perform a function of the communications module in the third embodiment under control of the processor.

Specifically, if the device is a terminal, the terminal is CPE.

Figure 37:
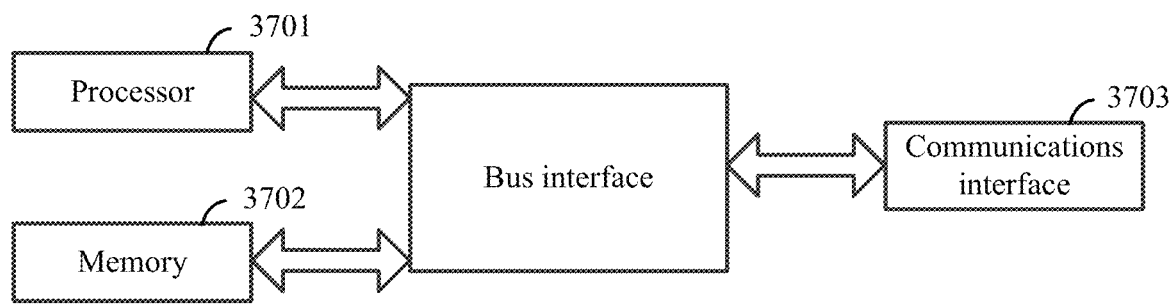
FIG. 37 is a schematic structural diagram of another device according to an embodiment of the present application.

Based on a same application idea, an eighth embodiment of the present application further provides a device. For specific implementation of the device, refer to the descriptions about the first device in the second embodiment. Repeated content is not described herein again. As shown in FIG. 37, the device mainly includes a processor 3701, a memory 3702, and a communications interface 3703. The communications interface 3703 is configured to receive and send data under control of the processor 3701. The memory 3702 stores a preset program. The processor 3701 reads the program in the memory 3702, and performs the following process according to the program:

instructing the communications interface to receive, by using an NCP layer of the device, a packet transmitted by an NCP layer of a second device; and processing the packet.

The NCP layer is located at a data link layer of a user plane, and the NCP layer of the device and the NCP layer of the second device form a direct data exchange channel between the device and the second device.

The device is a terminal and the second device is a core network device, or the device is a core network device and the second device is a terminal.

Specifically, the processor is configured to perform a function of the processing module in the fourth embodiment, and the communications interface is configured to perform a function of the communications module in the fourth embodiment under control of the processor.

In FIG. 36 and FIG. 37, the processor, the memory, and the communications interface are connected by using a bus. A bus architecture may include any quantity of interconnected buses and bridges, and specifically connects together a circuit of one or more processors represented by the processor and a circuit of a memory represented by the memory. The bus architecture may further connect, for example, a peripheral device or a voltage stabilizer to various other circuits such as a power management circuit. These are well known in the art, and therefore are not further described in this specification. A bus interface provides an interface. The processor is responsible for management of the bus architecture and general processing, and the memory may store data that is used by the processor to perform an operation.

In the embodiments of the present application, a packet is directly transferred between the terminal and the core network by using the NCP layer, functionally implementing direct transfer of the packet between the terminal and the core network. In addition, different from Scheme 1 in the background of the specification, the NCP transmits a packet on the user plane, avoiding affecting performance of a signaling plane and allowing carrying a packet sequence number required for multi-connection aggregation of the user plane. The NCP transmits the packet at a data link layer, so that an FMC multi-connection aggregation point is implemented in the 5G core network and the 5G core network can effectively implement FMC multi-connection management.

In addition, in the embodiments of the present application, the NCP uses an IP option as a protocol bearer, so that the NCP protocol header is compatible with an existing IP system and the function can be used in different access network standards. In the embodiments, the NCP uses a standard-independent protocol header unrelated to a standard, so that the NCP can be used in various standards, instead of being limited to a 3GPP channel.

A person skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage mediums (including but not limited to a disk memory, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A packet exchange method, comprising:
   obtaining, by a first device, a packet by using a Network Convergence Protocol (NCP) layer of the first device;
   sending, by the first device, the packet to an NCP layer of a second device by using the NCP layer of the first device, wherein the packet sent by using the NCP layer of the first device is a packet to request for fixed mobile convergence (FMC) multi-connection aggregation, a packet to request for FMC multi-connection management, a packet to request for private network awareness, or a packet to request for private network control;
   wherein the NCP layers are located at, or on top of, a data link layer of a user plane, and the NCP layer of the first device and the NCP layer of the second device form a direct data exchange channel between the first device and the second device; and
   wherein the first device is a terminal and the second device is a core network device, or the first device is a core network device and the second device is a terminal.

2. The method according to claim 1, wherein the packet is a packet for a fixed mobile convergence (FMC) scenario having a packet format compatible with the NCP layer of the first device or the second device.

3. The method according to claim 1, wherein the NCP layers are located at the top of the data link layer, and located below an Internet Protocol (IP) layer.

4. The method according to claim 3, wherein:
   when a Long Term Evolution (LTE) protocol is used for an access network (AN) between the first device and the second device, the NCP layers are located above a Packet Data Convergence Protocol (PDCP) layer; or
   when a digital subscriber line (DSL) protocol is used for an access network (AN) between the first device and the second device, the NCP layers are located above a Point-to-Point Protocol (PPP) layer.

5. The method according to claim 3, wherein:
   when a Long Term Evolution (LTE) protocol is used for an access network (AN) between the first device and the second device, the NCP layers are located above a Packet Data Convergence Protocol (PDCP) layer; or
   when a trusted Wireless Fidelity (Wi-Fi) protocol is used for an access network (AN) between the first device and the second device, the NCP layers are located above a Medium Access Control (MAC) layer.

6. The method according to claim 3, wherein:
   when a Long Term Evolution (LTE) protocol is used for an access network (AN) between the first device and the second device, the NCP layers are located above a Packet Data Convergence Protocol (PDCP) layer; or
   when an untrusted Wireless Fidelity (Wi-Fi) protocol is used for an access network (AN) between the first device and the second device, the NCP layers are located above an Internet Protocol Security (IPSec) layer.

7. The method according to claim 1, wherein:
   a protocol header of the NCP layers includes an Internet Protocol (IP) option of a specified option type; or
   a protocol header of the NCP layers comprises an NCP type and NCP data.

8. The method according to claim 1, wherein the packet includes a packet for a multi-connection link switch request indicating a switched-to active link for an active/standby link switching process that is proactively initiated.

9. A device, comprising at least one processor and a non-transitory computer readable medium having a plurality of computer readable instructions stored thereon that, when executed by the at least one processor, cause the device to:
   obtain a packet by using a Network Convergence Protocol (NCP) layer of the device;
   send the packet to an NCP layer of a second device by using the NCP layer of the device, wherein the NCP layers are located at, or on top of, a data link layer of a user plane, and the NCP layer of the device and the NCP layer of the second device form a direct data exchange channel between the device and the second device, wherein the packet sent by using the NCP layer of the first device is a packet to request for fixed mobile convergence (FMC) multi-connection aggregation, a packet to request for FMC multi-connection management, a packet to request for private network awareness, or a packet to request for private network control; and
   wherein the device is a terminal and the second device is a core network device, or the device is a core network device and the second device is a terminal.

10. The device according to claim 9, wherein the packet is a packet in a fixed mobile convergence (FMC) scenario having a packet format compatible with the NCP layer of the first device or the second device.

11. The device according to claim 9, wherein the NCP layers are located at the top of the data link layer, and located below an Internet Protocol (IP) layer.

12. The device according to claim 11, wherein:
   when a Long Term Evolution (LTE) protocol is used for an access network (AN) between the device and the second device, the NCP layers are located above a Packet Data Convergence Protocol (PDCP) layer; or
   when a digital subscriber line (DSL) protocol is used for an access network (AN) between the device and the second device, the NCP layers are located above a Point-to-Point Protocol (PPP) layer; or
   when a trusted Wireless Fidelity (Wi-Fi) protocol is used for an access network (AN) between the device and the second device, the NCP layers are located above a Medium Access Control (MAC) layer; or
   when an untrusted Wireless Fidelity (Wi-Fi) protocol is used for an access network (AN) between the device and the second device, the NCP layers are located above an Internet Protocol Security (IPSec) layer.

13. The device according to claim 9, wherein:
a protocol header of the NCP layers includes an Internet Protocol (IP) option of a specified option type; or
a protocol header of the NCP layers comprises an NCP type and NCP data.

14. A device, comprising at least one processor, and a non-transitory computer readable medium having a plurality of computer readable instructions stored thereon that, when executed by the at least one processor, cause the device to:
receive, by using a Network Convergence Protocol (NCP) layer of the device, a packet transmitted by an NCP layer of a second device, wherein the packet sent by using the NCP layer of the first device is a packet to request for fixed mobile convergence (FMC) multi-connection aggregation, a packet to request for FMC multi-connection management, a packet to request for private network awareness, or a packet to request for private network control;
process the packet, wherein the NCP layers are located at, or on top of, a data link layer of a user plane, and the NCP layer of the device and the NCP layer of the second device form a direct data exchange channel between the device and the second device; and
wherein the device is a terminal and the second device is a core network device, or the device is a core network device and the second device is a terminal.

15. The device according to claim 14, wherein the packet is a packet in a fixed mobile convergence (FMC) scenario having a packet format compatible with the NCP layer of the first device or the second device.

16. The device according to claim 14, wherein the NCP layers are located at the top of the data link layer, and located below an Internet Protocol (IP) layer.

17. The device according to claim 14, wherein:
when a Long Term Evolution (LTE) protocol is used for an access network (AN) between the device and the second device, the NCP layers are located above a Packet Data Convergence Protocol (PDCP) layer; or
when a digital subscriber line (DSL) protocol is used for an access network (AN) between the device and the second device, the NCP layers are located above a Point-to-Point Protocol (PPP) layer; or
when a trusted Wireless Fidelity (Wi-Fi) protocol is used for an access network (AN) between the device and the second device, the NCP layers are located above a Medium Access Control (MAC) layer; or
when an untrusted Wireless Fidelity (Wi-Fi) protocol is used for an access network (AN) between the device and the second device, the NCP layers are located above an Internet Protocol Security (IPSec) layer.

18. The device according to claim 14, wherein:
a protocol header of the NCP layers includes an Internet Protocol (IP) option of a specified option type; or
a protocol header of the NCP layers comprises an NCP type and NCP data.

\* \* \* \* \*